(12) United States Patent
Boda et al.

(10) Patent No.: US 8,610,722 B2
(45) Date of Patent: Dec. 17, 2013

(54) USER INTERFACE FOR AN APPLICATION

(75) Inventors: Ted Stephen Boda, San Jose, CA (US); Simon Alexander Robbie, Bradfordwoods, PA (US)

(73) Assignee: Apple Inc., Cupertino, CA (US)

( * ) Notice: Subject to any disclaimer, the term of this patent is extended or adjusted under 35 U.S.C. 154(b) by 774 days.

(21) Appl. No.: 12/694,228

(22) Filed: Jan. 26, 2010

(65) Prior Publication Data

US 2011/0181602 A1 Jul. 28, 2011

(51) Int. Cl.
*G06T 13/00* (2011.01)
*G06F 3/0481* (2013.01)

(52) U.S. Cl.
USPC ............................ 345/473; 715/730; 715/732

(58) Field of Classification Search
USPC .................................. 345/473; 715/726, 732
See application file for complete search history.

(56) References Cited

U.S. PATENT DOCUMENTS

| | | | | |
|---|---|---|---|---|
| 5,500,936 A | * | 3/1996 | Allen et al. ................... | 715/808 |
| 5,640,522 A | * | 6/1997 | Warrin ........................... | 715/732 |
| 5,886,697 A | * | 3/1999 | Naughton et al. ............. | 345/473 |
| 6,396,500 B1 | * | 5/2002 | Qureshi et al. ................ | 345/473 |
| 6,646,655 B1 | * | 11/2003 | Brandt et al. .................. | 715/723 |
| 7,102,643 B2 | * | 9/2006 | Moore et al. ................... | 345/473 |
| 7,526,726 B1 | * | 4/2009 | Skwarecki et al. ........... | 715/731 |
| 7,932,909 B2 | * | 4/2011 | Niles et al. ..................... | 345/474 |
| 2002/0060701 A1 | * | 5/2002 | Naughton et al. ............. | 345/853 |
| 2003/0090506 A1 | * | 5/2003 | Moore et al. .................. | 345/730 |
| 2003/0160813 A1 | * | 8/2003 | Raju .............................. | 345/730 |
| 2003/0197724 A1 | * | 10/2003 | Reed .............................. | 345/738 |
| 2003/0222890 A1 | * | 12/2003 | Salesin et al. ................. | 345/629 |
| 2005/0041872 A1 | | 2/2005 | Yim et al. | |
| 2006/0265659 A1 | * | 11/2006 | Collins et al. ................. | 715/732 |
| 2007/0266325 A1 | * | 11/2007 | Helm et al. .................... | 715/733 |
| 2008/0036776 A1 | * | 2/2008 | Niles et al. ..................... | 345/474 |

FOREIGN PATENT DOCUMENTS

EP 1508875 2/2005

OTHER PUBLICATIONS

Apple, "Keynote '08 User's Guide," © 2008 Apple Inc., 204 pages, retrieved from: http://manuals.info.apple.com/en/Keynote08_UserGuide.pdf.*
Kim et al., 1990, "DON: user interface presentation design assistant", Proceedings of the 3rd annual ACM SIGGRAPH symposium on User interface software and technology (UIST '90), ACM, New York, NY, USA, pp. 10-20.*
Ken Shoemake, 1992, "ARCBALL: a user interface for specifying three-dimensional orientation using a mouse", Proceedings of the conference on Graphics interface '92, Kellogg S. Booth and Alain Fournier (Eds.), Morgan Kaufmann Publishers Inc., San Francisco, CA, USA, pp. 151-156.*
Faithe Wempen, "Microsoft Powerpoint 2007 Bible", Chapter 18 and p. 748, John Wiley & Sons, Inc., New York, NY, USA, Published Feb. 27, 2007.*

(Continued)

*Primary Examiner* — Ulka Chauhan
*Assistant Examiner* — Roberta D Prendergast
(74) *Attorney, Agent, or Firm* — Fletcher Yoder PC

(57) ABSTRACT

A user interface is provided for interacting with slides and objects provided on slides. In certain embodiments, the user interface includes features that are displayed attached to or proximate to selected slides or objects. In embodiments, aspects of the user interface may be used to preview, review, add, or modify transitions associated with animation from one slide to the next (or previous) and builds associated with animation of objects on slides.

16 Claims, 21 Drawing Sheets

(56) References Cited

OTHER PUBLICATIONS

Richard Harrington, "Apple training Series: iWork '08", Lesson 3, Peachpit press, Published Oct. 17, 2007.*

Richard Harrington, "Apple training Series: iWork '08", Lesson 2, Peachpit press, Published Oct. 17, 2007.*

Apple, "Keynote 2 User's Guide," © 2005 Apple Inc., 152 pages, retrieved from: http://manuals.info.apple.com/en/Keynote2_UserGuide.pdf.*

Tom Negrino, "Keynote 2 for MAC OS X: Visual Quickstart Guide", Chapter 9, Peachpit Press, published Aug. 2005.*

Apple, Inc, Press Announcement, iWorks '08 productivity suite including Keynote'08, release date Aug. 7, 2007.*

Apple, Inc, Press Announcement, iWorks '09 productivity suite including Keynote '09, release date Jan. 6, 2009.*

GUI-definition, copyright 2004, retrieved from: http://www.linfo.org/gui.html.*

Anonymous; "Animations and Transitions", Versions 97/200, pp. 1-6; May 31, 2004 http://niobrara.unl.edu/users/lana/extension/ppt/lesson9/lesson9.HTML.

May, Andrew; "Creating Animation Sequences in PowerPoint 2003 (Part 1)", p. 1 chapter "introduction", p. 2, chapter "How Animation Sequences are Structured", p. 3, figure 1 and explanation below, p. 5, first paragraph; Jun. 30, 2004 http://msdn.microsoft.com/en-us/library/aa168134(office.11).aspx.

Fernicola, Pablo; "WPF-Pick Your API Abstraction", Mar. 21, 2006 http://www.fernicola.org/loquitor/index.php?/archives/17-WPF-Pick-Your-API-Abstraction.html.

Negrino, Tom; "Take advantage of the new animation tricks in Keynote '08", Feb. 6, 2008, pp. 1-5 http://www.macdeveloperjournal.com/article/131976/2008/02/www.idgconnect.com.

Anonymous; "Smoother Animation with Hardware Acceleration", The PowerPoint Blog, Nov. 25, 2006; on-line http://pptblog.tlccreative.com/index.php/all/2006/11/25/smoother_animation_with_hardware_acceler.

NVIDIA, "What is a GPUT?" 2004, http://www.nvidia.co.uk/content/nsist_on_nvidiadotcom_uk/whatisagpu.html.

Faithe Wempen, "PowerPoint 2007 Bible," Feb. 2007, John Wiley & Sons.

U.S. Appl. No. 12/694,210, filed Jan. 26, 2010, Ted Stephen Boda.

U.S. Appl. No. 11/834,614, filed Aug. 6, 2007, Eric Tilton.

U.S. Appl. No. 12/345,513, filed Dec. 29, 2008, Paul Bradford Vaughan.

* cited by examiner

USER INTERFACE FOR AN APPLICATION

BACKGROUND

The present disclosure relates generally to electronic devices, and, more particularly to electronic devices with projected displays that may be linked to form a shared workspace.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

One use which has been found for computers has been to facilitate the communication of information to an audience. For example, it is not uncommon for various types of public speaking, (such as lectures, seminars, classroom discussions, keynote addresses, and so forth), to be accompanied by computer generated presentations that emphasize or illustrate points being made by the speaker. For example, such presentations may include music, sound effects, images, videos, text passages, charts, diagrams, drawings, numeric examples or spreadsheets, or audiovisual content that emphasizes points being made by the speaker.

Typically, these presentations are composed of "slides" that are sequentially presented in a specified order. These slides may contain audiovisual content in the form of objects placed on the slides. One challenge that may face those who create such presentations are the complexities involved in creating and modifying the slides and objects used in a presentation and the association of effects with such slides and objects.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to a user interface that may be used to implement different types on animation in a slideshow presentation. For example, the user interface may be used to preview, review, add, and/or modify transition associated with moving from one slide to the next and object builds associated with moving or changing an object on a slide. In one embodiment, different aspects of the user interface may be provided in response to a user selecting an object or a slide for review or modification. For example, upon selecting a slide for review, a user interface may be displayed that is attached to or proximate to the selected slide or slide representation and which may then be navigated to create or modify the slide transition Likewise, upon selecting an object for review, a user interface may be displayed that is attached to or proximate to the selected object and which may then be navigated to create or modify a build associated with the object.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to a user interface for use in a presentation application. The user interface may be used to preview, review, assign, or modify slide transitions and/or object builds for slides of a presentation. In one embodiment, the user interface may be displayed attached or proximate to a selected slide or object, allowing a user to easily review or change the transition associated with a slide or the build associated with an object.

Figure 1:
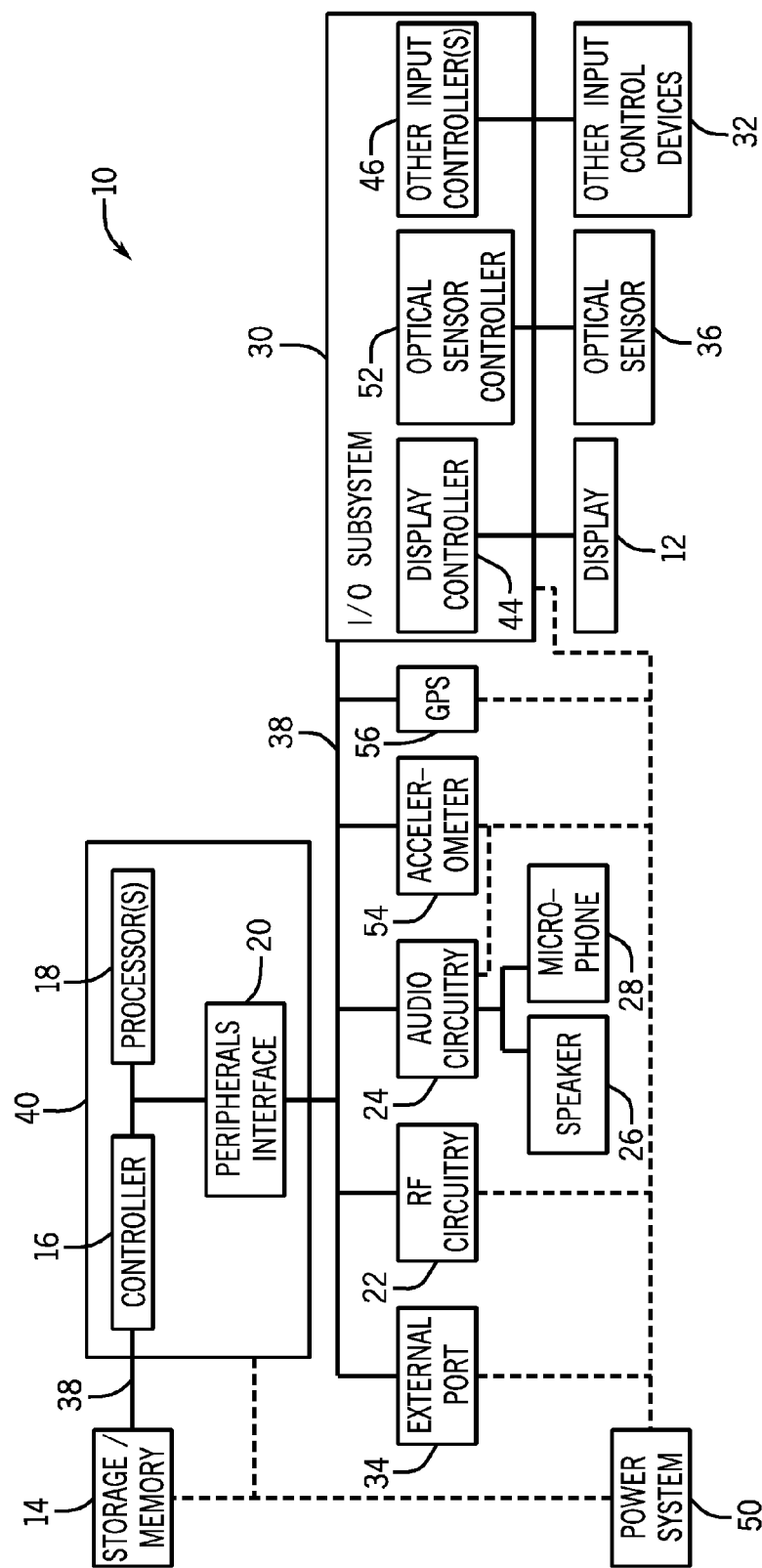
FIG. 1 is a block diagram of exemplary components of an electronic device that may be used in conjunction with aspects of the present disclosure.
Figure 2:
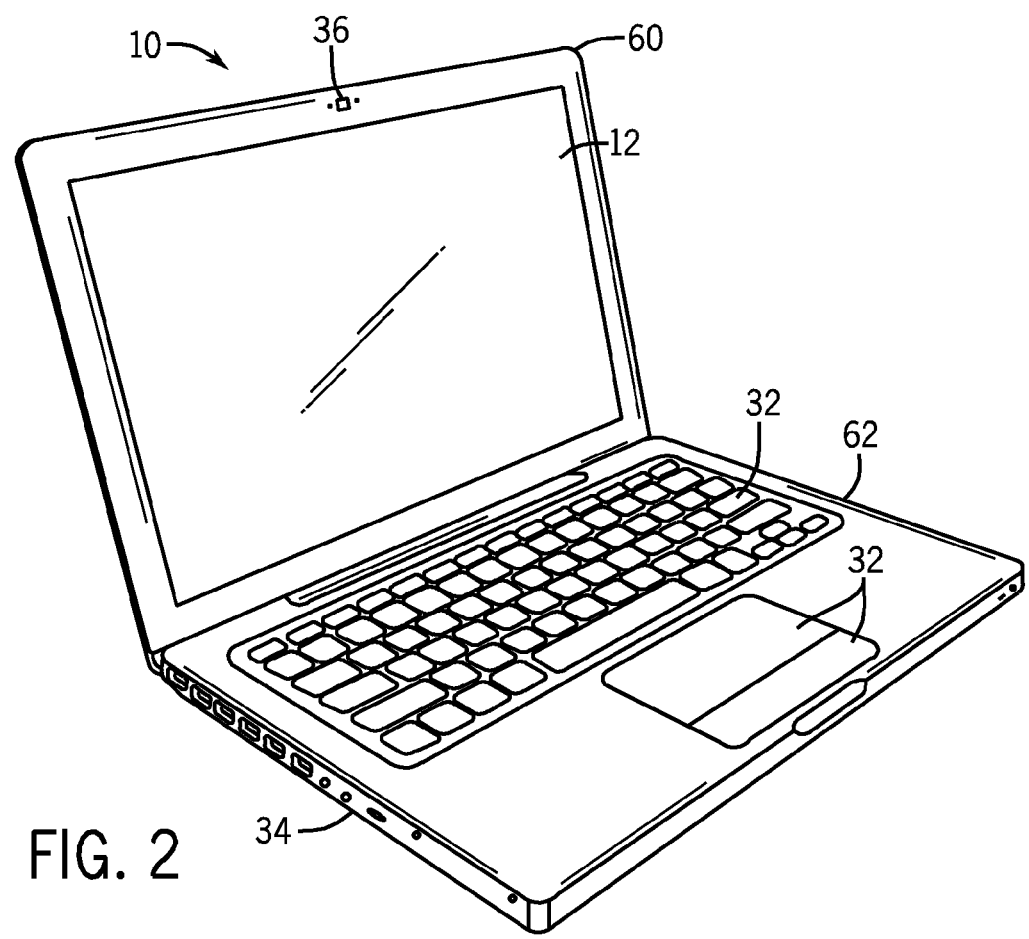
FIG. 2 is a perspective view of an electronic device in the form of a computer that may be used in conjunction with aspects of the present disclosure.
Figure 3:
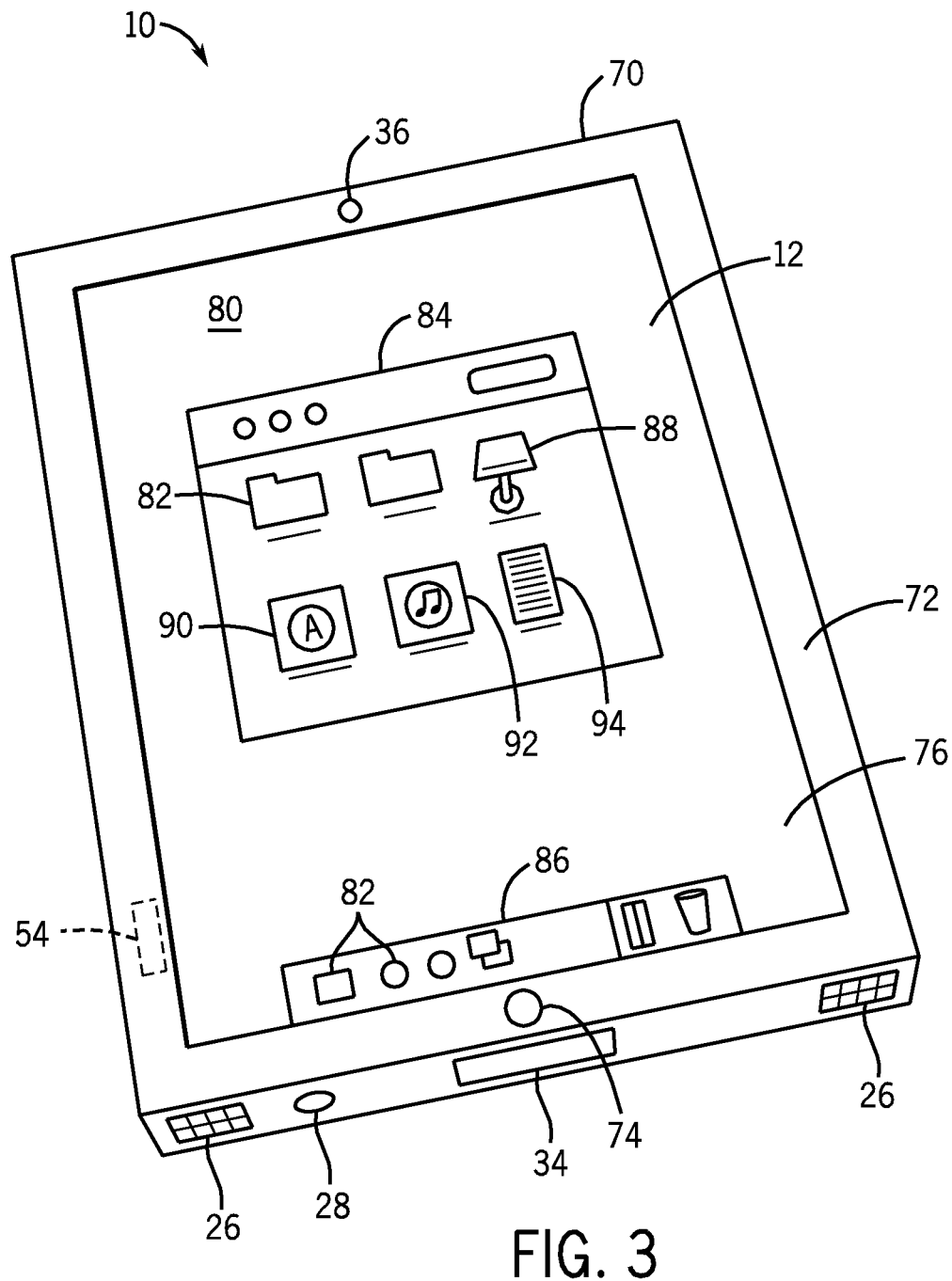
FIG. 3 is a perspective view of a tablet-style electronic device that may be used in conjunction with aspects of the present disclosure.

With these foregoing features in mind, a general description of suitable electronic devices for performing these functions is provided below. In FIG. 1, a block diagram depicting various components that may be present in electronic devices suitable for use with the present techniques is provided. In FIG. 2, one example of a suitable electronic device, here provided as a computer system, is depicted. In FIG. 3, another example of a suitable electronic device, here provided as a tablet-style device, is depicted. These types of electronic devices, and other electronic devices providing comparable display capabilities, may be used in conjunction with the present techniques.

An example of a suitable electronic device may include various internal and/or external components that contribute to the function of the device. FIG. 1 is a block diagram illustrating the components that may be present in such an electronic device 10 and which may allow the device 10 to function in accordance with the techniques discussed herein. As will be appreciated, various components of electronic device 10 may be provided as internal or integral components of the electronic device 10 or may be provided as external or connectable components. It should further be noted that FIG. 1 is merely one example of a particular implementation and is intended to illustrate the types of components and/or functionalities that may be present in electronic device 10.

In various embodiments, the electronic device 10 may be a media player, a cellular telephone, a laptop computer, a desktop computer, a tablet computer, a personal data organizer, an e-book reader (e-reader), a workstation, or the like. For example, in certain embodiments, the electronic device 10 may be a portable electronic device, such as a tablet device or a model of an iPod® or iPhone® available from Apple Inc. of Cupertino, Calif. In other embodiments, electronic device 10 may be a desktop, tablet, or laptop computer, including a MacBook®, MacBook® Pro, MacBook Air®, iMac®, Mac® Mini, or Mac Pro®, also available from Apple Inc. In further embodiments, electronic device 10 may include other models and/or types of electronic devices suitable for implementing the features disclosed herein.

As discussed herein, the electronic device 10 may be used to store and/or execute a variety of applications. Such applications may include, but are not limited to: drawing applications, presentation applications, a word processing applications, website creation applications, disk authoring applications, spreadsheet applications, gaming applications, telephone applications, video conferencing applications, e-mail applications, instant messaging applications workout support applications, photo management applications, digital camera applications digital video camera applications, web browsing applications, e-book reader applications, digital music player applications, and/or digital video player applications. Further, the electronic device 10 may be used to store, access, and/or modify data, routines, and/or drivers used in conjunction with such applications.

Various applications that may be executed on the electronic device 10 may utilize or share the same user interface devices, such as a touch-sensitive surface (e.g., a touch screen or touch pad), a mouse, a keyboard, and so forth. One or more functions of such interface devices, as well as corresponding information displayed on the electronic device 10, may be adjusted and/or varied from one application to the next and/or within a respective application. In this way, a common physical architecture (such as the interface devices provided by the electronic device 10) may support a variety of applications with user interfaces that are intuitive and transparent.

The depicted electronic device includes a display 12. In one embodiment, the display 12 may be based on liquid crystal display (LCD) technology, organic light emitting diode (OLED) technology, or light emitting polymer display (LPD) technology, although other display technologies may be used in other embodiments. In accordance with certain embodiments, the display 12 may include or be provided in conjunction with touch sensitive elements. Such a touch-sensitive display may be referred to as a "touch screen" and may also be known as or called a touch-sensitive display system.

In addition, the electronic device 10 may include one or more storage/memory components 14 (which may include one or more computer readable storage mediums), a memory controller 16, one or more processing units (CPUs, GPUs, and so forth) 18, a peripherals interface 20, RF circuitry 22, audio circuitry 24, a speaker 26, a microphone 28, an input/output (I/O) subsystem 30, input and/or control devices 32, and an external port 34. Further, in certain embodiments, the electronic device 10 may include one or more optical sensors 36. These components may communicate over one or more communication buses or signal lines 38.

It should be appreciated that the depicted electronic device 10 is only one example of a suitable device, and that the electronic device 10 may have more or fewer components than shown, may combine the functionality of two or more of the depicted components into a single component, or a may have a different configuration or arrangement of the components. Further, the various components shown in FIG. 1 may be implemented in hardware (including circuitry), software (including computer code stored on a computer-readable medium), or a combination of both hardware and software, including one or more signal processing and/or application specific integrated circuits.

With respect to the specific depicted components, the storage/memory component(s) 14 may include high-speed random access memory and/or may also include non-volatile memory, such as one or more magnetic disk storage devices, flash memory devices, or other non-volatile solid-state memory devices. Access to storage/memory components 14 by other components of the device 10, such as the processor 18 and the peripherals interface 20, may be controlled by one or more respective controllers 16, such as a memory controller, disk controller, and so forth.

The peripherals interface 20 couples various input and output peripherals of the electronic device 10 to the processor 18 and storage/memory components 14. The one or more processors 18 run or execute various software programs and/or sets of instructions stored in storage/memory components 14 (such as routines or instructions to implement the features discussed herein) to perform various functions on the electronic device 10 and/or to process data. In some embodiments, the peripherals interface 20, the processor 18, and the memory controller 16 may be implemented on a single chip, such as a chip 40. In other embodiments, these components and/or their functionalities may be implemented on separate chips.

The RF (radio frequency) circuitry 22 receives and sends RF signals, also called electromagnetic signals. The RF circuitry 22 converts electrical signals to/from electromagnetic signals and communicates with communications networks and other communications devices via the electromagnetic signals. The RF circuitry 22 may include known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 22 may communicate with networks, such as the Internet, also referred to as the World Wide Web (WWW), an intranet and/or a wireless network, such as a cellular telephone network, a wireless local area network (LAN) and/or a metropolitan area network (MAN), and/or other devices by wireless communication. The wireless communication may use any suitable communications standard, protocol and/or technology, including but not limited to Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., based upon the IMT Advanced standard), Long-Term Evolution Advanced (LTE Advanced), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), and/or Short Message Service (SMS), or any other suitable existing or later developed communication protocol.

The audio circuitry 24, the speaker 26, and the microphone 28 provide an audio interface between a user and the electronic device 10. In one embodiment, the audio circuitry 24 receives audio data from the peripherals interface 20, converts the audio data to an electrical signal, and transmits the electrical signal to the speaker 26. The speaker 26 converts the electrical signal to audible sound waves. The audio circuitry 24 also receives electrical signals converted by the microphone 28 from sound waves. The audio circuitry 24 converts the electrical signal to audio data and transmits the audio data to the peripherals interface 20 for processing. Audio data may be retrieved from and/or transmitted to the storage/memory components 14 and/or the RF circuitry 22 by the peripherals interface 20. In some embodiments, the audio circuitry 24 may include an output jack (e.g., an audio out jack or a headset jack). The output jack provides an interface between the audio circuitry 24 and removable audio input/output peripherals, such as output-only speakers, headphones or a headset with both output (e.g., a headphone for one or both ears) and input (e.g., a microphone).

The I/O subsystem 30 couples input/output peripherals on the electronic device 10, such as a display 12, and other input/control devices 32, to the peripherals interface 20. The I/O subsystem 30 may include a display controller 44 and one or more input controllers 46 for other input or control devices. The one or more input controllers 46 receive/send electrical signals from/to other input or control devices 32. The other input/control devices 32 may include physical buttons (e.g., push buttons, rocker buttons, etc.), dials, slider switches, joysticks, click wheels, a touch pad, and so forth. In some alternate embodiments, the input controller(s) 46 may be coupled to any (or none) of the following: a keyboard, infrared port, USB port, and/or a pointer device such as a mouse. Examples of input/control devices 32 in the form of buttons may include an up/down button for volume control of the speaker 26 and/or the microphone 28, on/off buttons, and/or buttons used to invoke a home screen on the display 12 of the electronic device 10.

When present, a display 12 implemented as a touch screen provides an input interface and an output interface between the electronic device 10 and a user. In one such embodiment, the display controller 44 receives and/or sends electrical signals from/to the display 12 and the corresponding touch sensitive elements. The display 12 displays visual output to the user. The visual output may include graphics, alphanumeric characters, icons, video, and so forth (collectively termed "graphics"). In some embodiments, some or all of the visual output may correspond to user-interface objects.

In embodiments employing a touch screen, the display 12 has a touch-sensitive surface, sensor or set of sensors that accepts input from the user based on haptic and/or tactile contact. The touch screen and the display controller 44 generate signals in response to contact (and any movement or breaking of the contact) on the display 12, and the signals may be received and processed in accordance with routines executing on the processor 18 such that the signals (and the contact they represent) are recognized as interactions with user-interface objects that are displayed on the display 12. In an exemplary embodiment, a point of contact between a touch screen 12 and the user corresponds to an appendage, e.g., a finger, of the user, and/or a stylus wielded by the user.

In embodiments where a touch screen is employed, the display 12 and the display controller 44 may detect contact and/or movement (or breaks in such movement) using a suitable touch sensing technologies, including but not limited to capacitive, resistive, infrared, and surface acoustic wave technologies, as well as other proximity sensor arrays or other elements for determining one or more points of contact with the display 12. The user may make contact with such a touch sensitive display 12 using any suitable object or appendage, such as a stylus, a finger, and so forth. In some embodiments, a touch-sensitive display may be multi-touch sensitive, i.e., sensitive to multiple concurrent contacts. In an exemplary embodiment, projected mutual capacitance sensing technology is used, such as that found in the iPhone® and iPod Touch® from Apple, Inc. of Cupertino, Calif.

The electronic device 10 also includes a power system 50 for powering the various components. The power system 50 may include a power management system, one or more power sources (e.g., battery, alternating current (AC)), a recharging system, a power failure detection circuit, a power converter or inverter, a power status indicator (e.g., a light emitting diode (LED)) and any other components associated with the generation, management and distribution of power in electronic devices.

The electronic device 10 may also include one or more optical sensors 36. FIG. 1 shows an optical sensor 36 coupled to an optical sensor controller 52 in the I/O subsystem 30. The optical sensor 36 may include a charge-coupled device (CCD) or complementary metal-oxide semiconductor (CMOS) phototransistors. The optical sensor 36 receives light from the environment, projected through one or more lens, and converts the light to data representing an image. In conjunction with appropriate code executing on the processor 18, the optical sensor 36 may capture still images and/or video.

The electronic device 10 may also include one or more accelerometers 54 and/or position sensing circuitry (e.g., GPS circuitry 56). By way of example, FIG. 1 shows an accelerometer 54 and GPS circuitry coupled to the peripherals interface 20. Alternately, the accelerometer 54 and/or the GPS circuitry 56 may be coupled to an input controller 46 in the I/O subsystem 30. In some embodiments, information is displayed on the display 12 in a portrait view or a landscape view based on an analysis of data received from the one or more accelerometers (e.g., based upon a position in which the electronic device 10 is presently oriented).

In some embodiments, the software components stored in storage/memory 14 may include an operating system, a communication module (or set of instructions), a contact/motion module (or set of instructions), a graphics module (or set of instructions), as well as any other suitable modules or instructions used in the operation of the device 10 or by interfaces or applications executing on the device 10. By way of example, an operating system may be based upon various software platforms, such as Darwin, RTXC, Linux®, UNIX®, Mac OS X, Microsoft Windows®, or an embedded operating system such as VxWorks, and may include various software components and/or drivers for controlling and managing general system tasks (e.g., memory management, storage device control, power management, etc.) and facilitates communication between various hardware and software components.

In addition, the software components stored in storage/memory 14 may include various applications and media (e.g., music, videos, e-books) loaded or purchased by a user of the device 10 to provide additional functionality to the device 10. By way of example only, the storage/memory 14 may be configured to store applications and media purchased and/or downloaded from the App Store® or from iTunes®, both of which are online services offered and maintained by Apple Inc.

The communication module facilitates communication with other devices over one or more external ports 34 and also includes various software components for handling data received by the RF circuitry 22 and/or the external port 34. The external port 34 (e.g., Universal Serial Bus (USB), FireWire (IEEE 1394 High Speed Serial Bus), Ethernet port, etc.) is adapted for coupling directly to other devices or indirectly over a network (e.g., the Internet, wireless LAN, etc.). In some embodiments, the external port 34 is a multi-pin (e.g., 30-pin) connector that is the same as, or similar to and/or compatible with the 30-pin connector used on iPod® devices.

The contact/motion module may facilitate the detection and/or interpretation of contact with a touch sensitive input device, such as a touch screen, click wheel or touch pad. The contact/motion module includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts).

The graphics module includes various known software components for rendering and displaying graphics on the display 12 or other connected displays or projectors, including components for changing the intensity of graphics that are displayed. As used herein, the term "graphics" includes any object that can be displayed to a user. In some embodiments, the graphics module stores data representing graphics to be used. Each graphic may be assigned a corresponding code. The graphics module receives, from applications etc., one or more codes specifying graphics to be displayed along with, if necessary, coordinate data and other graphic property data, and then generates screen image data to output to the display controller 44.

Examples of applications that may be stored in storage/memory 14 may include work productivity applications as well as other applications. Examples of such applications may include word processing applications, image editing applications, drawing applications, presentation applications, Java-enabled applications, encryption, digital rights management, voice recognition, and voice replication.

With the foregoing discussion of the functional and structural components of an electronic device 10 in mind, FIGS. 2 and 3 depict examples of how such a device 10 may be implemented in practice. For example, FIG. 2 depicts an electronic device 10 in the form of a laptop computer 60. As shown in FIG. 2, the electronic device 10 in the form of a laptop computer 60 includes a housing 62 that supports and protects interior components, such as processors, circuitry, and controllers, among others. The housing 62 also allows access to user input devices 32, such as a keypad, touchpad, and buttons, that may be used to interact with the laptop computer 60. For example, the user input devices 32 may be manipulated by a user to operate a GUI and/or applications running on the laptop computer 60.

The electronic device 10 in the form of the laptop computer 60 also may include various external ports 34 that allow connection of the laptop computer 60 to various external devices, such as a power source, printer, network, or other electronic device. For example, the laptop computer 60 may be connected to an external projector through a cable connected to a respective external port 34 of the laptop computer 60.

In addition to computers, such as the depicted laptop computer 60 of FIG. 2, an electronic device 10 may take other forms, such as a portable multi-function device 70 (such as a cellular telephone or a tablet computing device) as depicted in FIG. 3. It should be noted that while the depicted multi-function device 70 is provided in the context of a tablet computing device, other types of portable or handheld devices (such as cellular telephones, media players for playing music and/or video, a camera or video recorder, personal data organizers, handheld game platforms, and/or combinations of such devices) may also be suitably provided as the electronic device 10. Further, a suitable multi-function device 70 may incorporate the functionality of more than one of these types of devices, such as a device that incorporates the functionality of two or more of a media player, a cellular phone, a gaming platform, a personal data organizer, and so forth. For example, in the depicted embodiment, the multi-function device 70 is in the form of a tablet computer that may provide various additional functionalities (such as the ability to take pictures, record audio and/or video, listen to music, play games, and so forth).

In the depicted embodiment, the handheld device 70 includes an enclosure or body 72 that protects the interior components from physical damage and shields them from electromagnetic interference. The enclosure may be formed from any suitable material such as plastic, metal or a composite material and may allow certain frequencies of electromagnetic radiation to pass through to wireless communication circuitry within the handheld device 70 to facilitate wireless communication.

In the depicted embodiment, the enclosure 72 includes user input structures 32 (such as the depicted button 74 and touch sensitive elements 76 incorporated into display 12 to form a touch screen) through which a user may interface with the device 70. Each user input structure 32 may be configured to help control a device function when actuated. For example, the button 74 may be configured to invoke a "home" screen or menu to be displayed. Other buttons, switches, rockers, and so forth may be provided to toggle between a sleep and a wake mode, to silence a ringer or alarm, to increase or decrease a volume output, and so forth.

In the depicted embodiment, the multi-function device 70 includes a display 12 that may be used to display a graphical user interface (GUI) 80 that allows a user to interact with the multi-function device 70. The GUI 80 may include various layers, windows, screens, templates, or other graphical elements that may be displayed in all, or a portion, of the display 12. The graphical elements may include icons 82 and other images representing buttons, sliders, menu bars, and the like. The icons 82 may be selected and/or activated via touching their locations on the display 12 in embodiments in which the display 12 is provided as a touch screen.

Generally, the GUI 80 may include graphical elements that represent applications and functions of the multi-function device 70. For instance, in the depicted embodiment, an operating system GUI 80 may include various graphical icons 82, each of which may correspond to various applications that may be opened or executed upon detecting a user selection (e.g., via keyboard, mouse, touchscreen input, voice input, etc.). The icons 82 may be displayed in a graphical dock 86 or within one or more graphical window elements 84 displayed on the screen of the display 12. By way of example only, the depicted icons 82 may represent a presentation application 88, such as Keynote® from Apple Inc., an application 90 for accessing the App Store® service from Apple Inc., an application 92 for accessing the iTunes® service from Apple Inc., as well as an e-reader/e-book application 94.

In some embodiments, the selection of a particular icon 82 may lead to a hierarchical navigation process, such that selection of an icon 82 leads to a screen or opens another graphical window that includes one or more additional icons 82 or other GUI elements. By way of example only, the operating system GUI 80 displayed in FIG. 3 may be from a version of the Mac OS® operating system, available from Apple Inc.

The multi-function device 70 also may include various external ports 34 that allow connection of the multi-function device 70 to external devices, such as computers, projectors, modems, telephones, external storage devices, and so forth. For example, one external port may be a port that allows the transmission and reception of data or commands between the multi-function device 70 and another electronic device, such as a computer. One or more of external ports 34 may be a proprietary port from Apple Inc. or may be an open standard I/O port.

With the foregoing discussion in mind, various techniques and algorithms for implementing aspects of the present disclosure on electronic devices 10 and associated hardware and/or memory devices are discussed below. For example, in certain implementations, an electronic device 10 may be employed to store and/or run a work productivity application or suite of applications. One example of such applications includes the Pages® word processing application, the Numbers® spreadsheet application, and the Keynote® presentation application, which are all provided within the iWork® application suite available from Apple Inc. of Cupertino, Calif. In certain embodiments, such applications, or aspects of such applications, may be encoded using a suitable object-oriented programming language, such as Objective-C, C++, C#, and so forth.

By way of example, a presentation application, such as Keynote® may be employed to generate and present slideshows, typically consisting of a sequential display of prepared slides. For example, turning to FIG. 4, an illustrative screen 120 of a presentation application is depicted in accordance with one embodiment of the disclosure. Such a presentation application may be stored as one or more executable routines in storage/memory 14 (FIG. 1) and, when executed, may cause the display of screens, such as screen 120, on a display 12, such as a display configured for use as a touch screen.

Prior to discussing the use or features of a presentation application in accordance with the present disclosure, it should be appreciated that, as used herein, a "slide" should be understood to refer to a discrete unit on which one or more objects may be placed and arranged. Such slides should also be understood to be discrete units or elements of an ordered or sequential presentation, i.e., the slides are the pieces or units that are assembled and ordered to generate the presentation. Such a slide, may be understood to function as a container or receptacle for a set of objects (as discussed below) that together convey information about a particular concept or topic of the presentation. A slide may contain or include different types of objects (e.g., text, numbers, images, videos, charts, graphs, and/or audio, and so forth) that explain or describe a concept or topic to which the slide is directed and which may be handled or manipulated as a unit due to their being associated with or contained on the slide unit.

The order or sequence of the slides in a presentation or slideshow is typically relevant in that the information on the slides (which may include both alphanumeric (text and numbers) and graphical components) is meant to be presented or discussed in order or sequence and may build upon itself, such that the information on later slides is understandable in the context of information provided on preceding slides and would not be understood or meaningful in the absence of such context. That is, there is a narrative or explanatory flow associated with the ordering or sequence of the slides. As a result, if presented out of order, the information on the slides may be unintelligible or may otherwise fail to properly convey the information contained in the presentation. This should be understood to be in contrast to more simplistic or earlier usages of the term "slide" and "slideshow" where what was typically shown was not a series of multimedia slides containing sequentially ordered content, but projected photos or images which could typically be displayed in any order without loss of information or content.

As used herein, the term "object" refers to any individually editable component on a slide of a presentation. That is, something that can be added to a slide and/or be altered or edited on the slide, such as to change its location, orientation, size, opacity, color, or to change its content, may be described as an object. For example, a graphic, such as an image, photo, line drawing, clip-art, chart, table, which may be provided on a slide, may constitute an object. Likewise, a character or string of characters may constitute an object. Likewise, an embedded video or audio clip may also constitute an object that is a component of a slide. Therefore, in certain embodiments, characters and/or character strings (alphabetic, numeric, and/or symbolic), image files (.jpg, .bmp, .gif, .tif, .png, .cgm, .svg, .pdf, .wmf, and so forth), video files (.avi, .mov, .mp4, .mpg, .qt, .rm, .swf, .wmv, and so forth) and other multimedia files or other files in general may constitute "objects" as used herein. In certain graphics processing contexts, the term "object" may be used interchangeably with terms such as "bitmap" or "texture".

Further, because a slide may contain multiple objects, the objects on a slide may have an associated z-ordering (i.e., depth) characterizing how the objects are displayed on the slide. That is, to the extent that objects on the slide may overlap or interact with one another, they may be ordered, layered or stacked in the z-dimension with respect to a viewer (i.e., to convey depth) such that each object is ordered as being above or beneath the other objects as they appear on the slide. As a result, in the event of an overlap of objects, a higher object can be depicted as overlying or obscuring a lower object. In this way, a slide may not only have a width and length associated with it, but also a depth (i.e., a z-axis).

Thus, as used herein, the term "slide" should be understood to represent a discrete unit of a slideshow presentation on which objects may be placed or manipulated. Likewise, an "object" as used herein should be understood to be any individually editable component that may be placed on such a slide. As discussed herein, the slide may include a "canvas" (see, for example, slide canvas 128 of FIGS. 4-20) of fixed size that defines the space on the slide where objects can reside (e.g., be placed, moved, manipulated, and so forth. Further, as used herein, the term "transition" describes the act of moving from one slide to the next slide in a presentation. Such transitions may be accompanied by animations or effects applied to one or both of the incoming and outgoing slide. Likewise, the term "build" as used herein should be understood as describing effects or animations applied to one or more objects provided on a slide or, in some instances to an object or objects that are present on both an outgoing and incoming slide. For example, an animation build applied to an object on a slide may cause the object to be moved and rotated on the slide when the slide is displayed. Likewise, a dissolve out applied to an object on a slide may cause the object to fade out some time before the slide disappears from the display.

Figure 4:
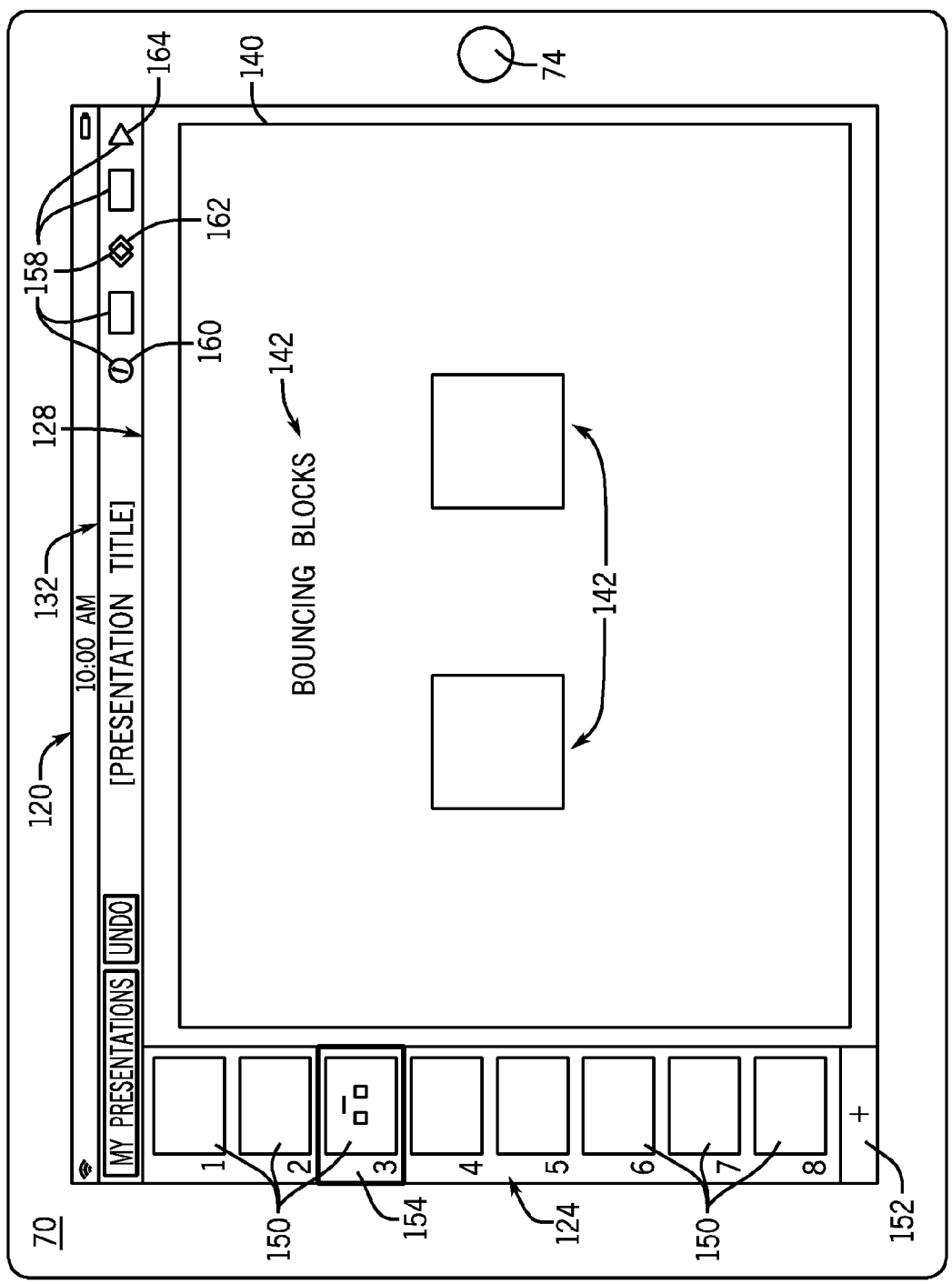
FIG. 4 depicts a screen of a presentation application used for generating slides in accordance with aspects of the present disclosure.

With the foregoing in mind, and turning to FIG. 4, it will be appreciated that, in certain embodiments a presentation application may provide multiple modes of operation, such as an edit mode, an animation mode, a presentation or play mode, and so forth. When in the edit mode, the presentation application may provide an interface for a user to add, edit, remove, or otherwise modify the slides of a slide show, such as by adding text, numeric, graphic, or video objects to a slide. Likewise, when in the animation mode, the presentation application may provide an interface for a user to apply and/or modify animation or effects applied to slide transitions between slides or to builds (e.g., animations, effects, and so forth) applied to objects on a slide. The edit and/or animation modes may also provide previews, full-screen or reduced in size, of how the slides will appears when presented (such as by displaying the specified object builds and slide transitions). To display a created slide or a sequence of slides in a format suitable for audience viewing, a presentation mode of the presentation application may be employed which displays the slides, slide transitions, and object builds in a specified sequence. In some embodiments, the presentation application may provide a full-screen presentation of the slides in the presentation mode, including any animations, transitions, builds or other properties defined for each slide and/or object within the slides.

The screen 120 of FIG. 4 represents a screen that may be displayed when one embodiment of a presentation application is in an edit mode, such as for slide creation or modification. In the depicted example, the screen 120 includes three panes: a slide organizer or navigator pane 124, a slide canvas 128, and a toolbar 132 for creating and editing various aspects of a slide 140 of a presentation. By using these panes, a user may select a slide 140 of a presentation, add objects 142 to and/or edit objects 142 on the slide 140 (such as the depicted graphic objects and character objects), and animate or add effects related to the slide or the objects 142 on the slide 140.

The navigator pane 124 may display a representation 150 of each slide 140 of a presentation that is being generated or edited. The slide representations 150 may take on a variety of forms, such as an outline of the text in the slide 140 or a thumbnail image of the slide 140. Navigator pane 124 may allow the user to organize the slides 140 prepared using the application. For example, the user may determine or manipulate the order in which the slides 140 are presented by dragging a slide representation 150 from one relative position to another or may designate slides 140 to be skipped during a presentation. In certain embodiments, the slides representations 150 in the navigator pane 124 may be indented or otherwise visually set apart for further organizational clarity. In such cases, the user may be able to expand/collapse the indented slides to facilitate interactions with and/or review of the navigator pane 124. In addition, in certain embodiments, the navigator pane 124 may include an option 152 which, when selected, adds a new slide to the presentation. After being added, the slide representation 150 for such a new slide may be selected in the navigator pane 124 to display the slide 140 on the slide canvas 128 where objects 142 may be added to the new slide 140 and/or the properties of the new slide 140 may be manipulated.

In certain implementations, selection of a slide representation 150 in the navigator pane 124 results in the presentation application displaying the corresponding slide information on the slide canvas 128. For example, for a selected slide representation (here depicted as slide "3", identified by highlight region 154) the corresponding slide 140 may be displayed on the slide canvas 128. The displayed slide 140 may include one or more suitable objects 142 such as, for example, text, images, graphics, video, or any other suitable object. In some embodiments, a user may add or edit features or properties of a slide 140 when displayed on the slide canvas 128, such as slide transitions, slide background, and so forth. In addition, in some embodiments a user may add objects 142 to or remove objects 142 from the slide 140 or may manipulate an object 142 on the slide 140, such as to change the location or appearance of the object 142 or to add or edit animations or builds to the object 142. The user may select a different slide 140 to be displayed for editing on slide canvas 128 by selecting a different slide representation 150 from the navigator pane 124, such as by touching the displayed slide representation 150 in a touch screen embodiment of the device 10.

In the depicted implementation a user may customize objects 142 associated with the slide 140 or the properties of the slide 140 using various tools provided by the presentation application. For example, in certain embodiments, when in the edit mode, selection of a slide 140, object 142, and/or toolbar option 158 may cause the display of an interface presenting one or more selectable options for the selected slide 140 or object 142, which a user may then select, deselect, or otherwise manipulate to modify the slide 140 or object 142 as desired. For example, selection of certain toolbar options 158, such as an inspector or information icon 160, may cause properties of the selected object 142 or slide 140 to be displayed for review and/or modification. Likewise, selection of a play mode icon 164 from among the toolbar options 158 may cause the presentation application to enter a presentation mode in which the slides 140 of the slide presentation are sequentially displayed on the display 12 or an attached display device.

Figure 5:
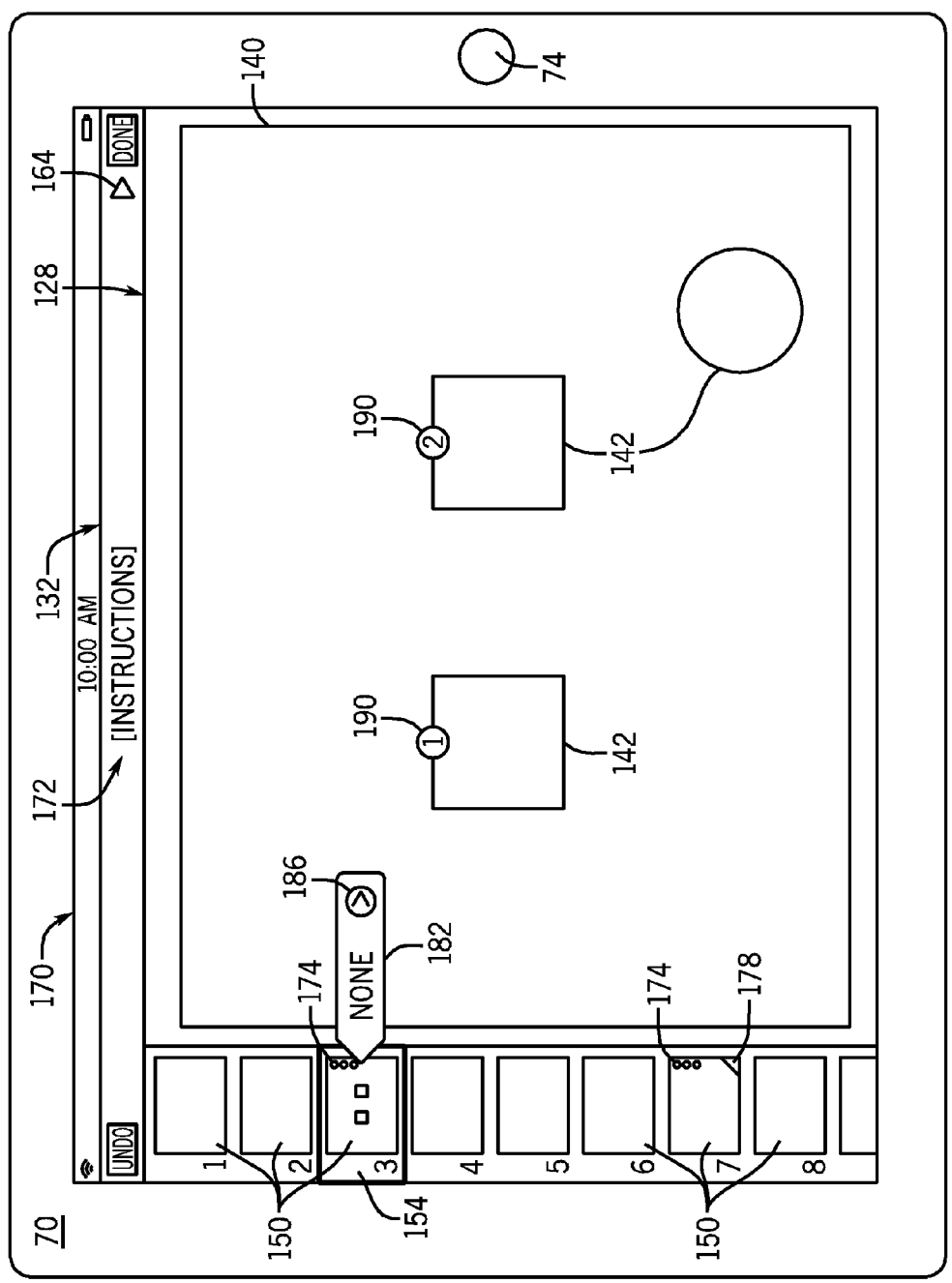
FIG. 5 depicts an animation mode screen of a presentation application in accordance with aspects of the present disclosure.

Similarly, in one embodiment selection of an animation mode icon 162 from among the toolbar options 158 may cause the presentation application to enter an animation mode from which builds or animations applied to objects and/or transitions assigned to slides may be previewed, reviewed, edited, and/or manipulated. Turning now to FIG. 5, an example of an animation mode screen 170 that might be invoked is depicted. In this example, a slide representation 150 may be selected in the navigator pane 124, as in the edit mode. The selected slide 140 is displayed on the slides canvas 128. In addition, the screen 170 may include instructions 172 or explanatory material providing guidance to a user. In the depicted example, the user may exit the animation mode and return to the edit mode by selection of an exit button 168 or by providing another recognized exit command.

When in the animation mode, additional animation specific information may be displayed within the navigator pane 124 and/or in the slide canvas 128. For example, one or more object build indicators 174 and/or slide transition indicators 178 may be displayed on the slide representations 150 in the navigator pane 124. Such object build indicators 174 and slide transition indicators 178 may provide a visual indication as to whether objects 142 having associated builds (e.g., animations) are present on a corresponding slide 140. Thus, a user need only review the navigator panel 124 to determine what slides 140 have an animated transition associated with them and/or which slides 140 contain object 142 that have associated builds.

For example, in the depicted implementation, the object build indicator 174 is provided as a column of circular markers on the slide representation 150. In one such embodiment, the markers may be shaded, color coded or color filled (such as yellow, red, green, black, or blue filled) to make the object build indicators 174 more visible. As will be appreciated, though circular markers are depicted as the object build indicators 174 in FIG. 5, other types, shapes, or colors of markers or visual indicators may be employed to indicate the presence and/or number of objects 142 with builds present on a slide 140. For example, square, triangular, oval, rectangular, or other shapes of markers of any color or shading may be employed as object build indicators 174, as might any other suitable visual representation.

Similarly, the slide transition indicator 178, here depicted as a triangular or "corner cut-out" type indicator on the slide representations 150, may provide a visual indication that one or more animated transitions are associated with the corresponding slide 140. For example, the corresponding slide 140 may have an animated transition when the slide 140 is introduced or exited during a presentation. As with the object build indicators 174, the slide transition indicators may be shaded, color coded or color filled (such as yellow, red, green, black, or blue filled) to make the slide transition indicators 178 more visible. As will be appreciated, though triangular or corner cut-out markers are depicted as the slide transition indicators 178 in FIG. 5, other types, shapes, or colors of markers or visual indicators may be employed to indicate the presence of a slide transition associated with a corresponding slide 140. For example, square, circular, oval, rectangular, or other shapes of markers of any color or shading may be employed as slide transition indicators 174, as might any other suitable visual representation.

In addition, in certain embodiments additional slide transition and object build information may be provided for a selected slide 140 when in an animation mode. Notably, in certain embodiments, a user interface is attached and/or associated with each slide or object when the slide or object is selected, as opposed to a generic or general inspector or information window being opened without a connection to the selected slide or object. For example, as depicted on screen 170, a transition marker 182 may be displayed for a selected slide 140, here indicated by a highlighted 154 slide representation 150 in the navigator pane 124. In one embodiment, the transition marker 182 may display the type of transition effect associated with a selected slide 140. For example, as indicated by the absence of a slide transition indicator 178, the depicted selected slide 140 in FIG. 5 does not have an associated transition effect. This absence of a transition effect is corroborated by the transition marker 182 which indicates by text that the transition effect for the selected slide 140 is "None". If a transition effect were associated with the selected slide, the transition marker 182 would instead display text identifying or describing the type of transition effect associated with the slide 140, such as Anagram, Cube, Doorway, and so forth. In addition, the transition marker 182 may include a selectable icon 186 which upon selection displays additional transition information or options, as discussed in greater detail below.

As noted above, in certain implementations additional object and/or object build information may also be provided for a selected slide when in an animation mode. For example, as depicted on screen 170 of FIG. 5, each object 142 having a build may be marked or tagged with a build indicator 190. Conversely, in the depicted embodiment, objects 142 with no associated build are not displayed with a corresponding build indicator 190. In the depicted embodiment, the build indicator may indicate a build sequence, i.e., the order in which builds are applied to the respective objects 142 on a slide. For example, an object 142 having a build that is earlier in the build order may be animated prior to an object 142 having a build that is later in the build order. In addition, builds may be applied to objects to move the object 142 onto the screen (i.e., a build-in) or to move an object 142 off of the screen (i.e., a build-out) and an object 142 may have both an associated build-in for introducing the object 142 and separate build-out for removing the object 142. Thus, there may be a separate sequence or order associated with the build-in of objects 142 and with the build-out of objects 142. For example, turning to FIG. 5, the build indicators 190 display a build-in order for the objects 142, with the leftmost object building in prior to the rightmost object.

Figure 6:
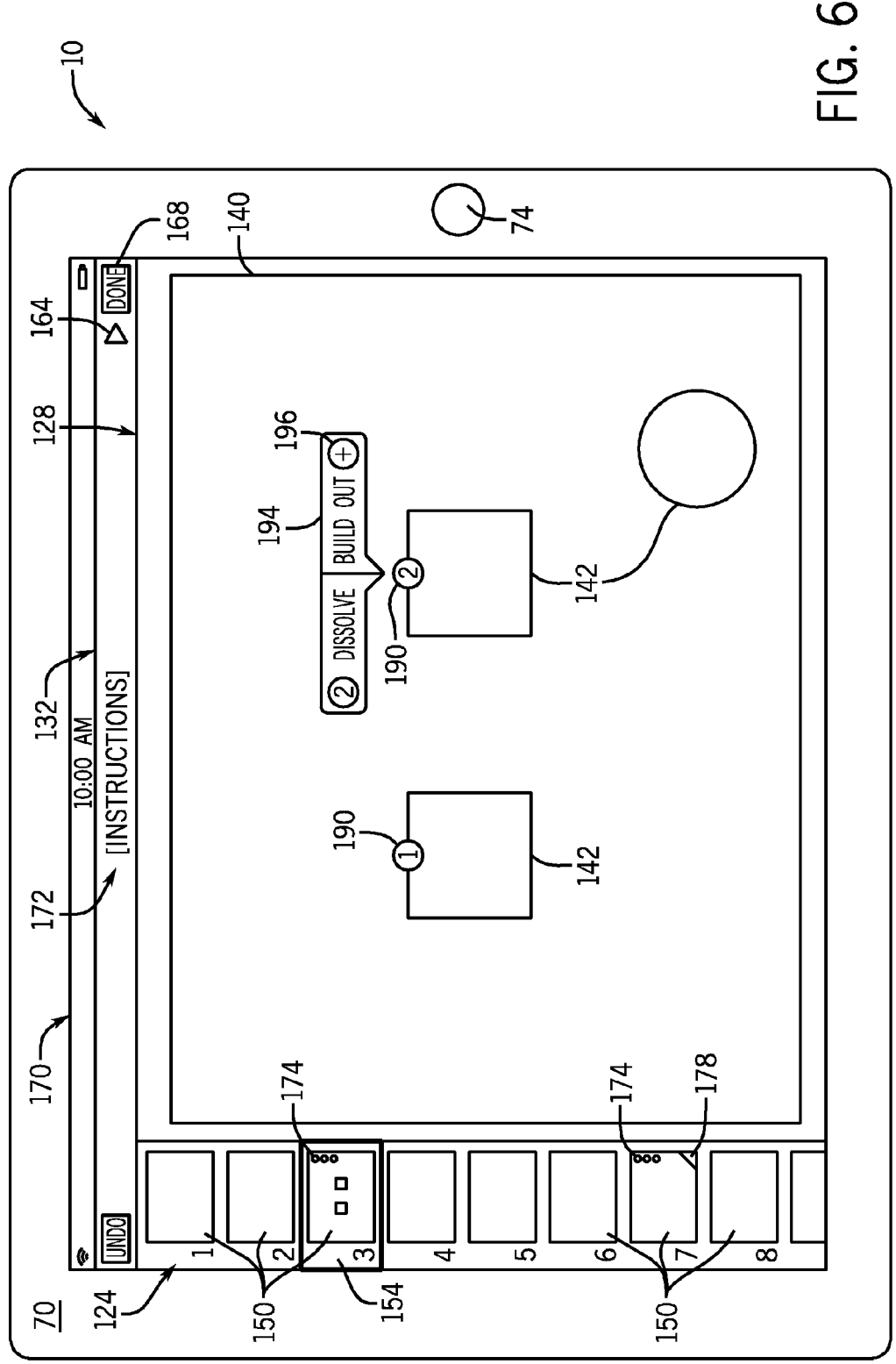
FIG. 6 depicts an animation mode screen of a presentation application in accordance with further aspects of the present disclosure.

Turning to FIG. 6, in one embodiment a build marker 194 may be displayed for a selected object 142 on the slide canvas 128. Such a build marker 194 may convey additional object build information, such as naming or describing a build-in and/or build-out effect to be applied to the selected object and the respective sequence or order associated with each listed build-in and/or build-out effect. For example, as depicted in FIG. 6, a build marker 194 is shown that indicates that a Dissolve animation is used to build-in the selected object and that the Dissolve animation is the second build in the build-in order for the slide 140. In this example, the right-most half of the build marker 194 conveys build-out information, here depicting that no build out animation is currently specified. In the absence of a selected build-out and sequence, a selectable icon 196 may be provided which, upon selection, would allow the user to add a build-out for the selected object and/or to specify the order in which such a build-out would be performed.

In one embodiment, as depicted in FIGS. 5 and 6, to simplify the user interface and to preserve screen space for depicting the respective slides and objects, only one animation control (e.g., transition marker 182, build marker 194, or transition box 200 and build box 240 discussed below) may be displayed at a time. For example, if a user has most recently selected a slide representation 150 in the navigator pane 240, a slide-related animation control (e.g., transition marker 182 or transition box 200) may be displayed. Conversely, if a user has most recently selected an object 142 displayed on the slide canvas 128, an object-related animation control (e.g., build marker 194 or build box 240) may be displayed. Thus, in such an embodiment, only a slide-related animation control or an object-related animation control would be displayed at one time. However, in other embodiments, both a slide-related animation control and an object-related animation control might be concurrently displayed.

Figure 7:
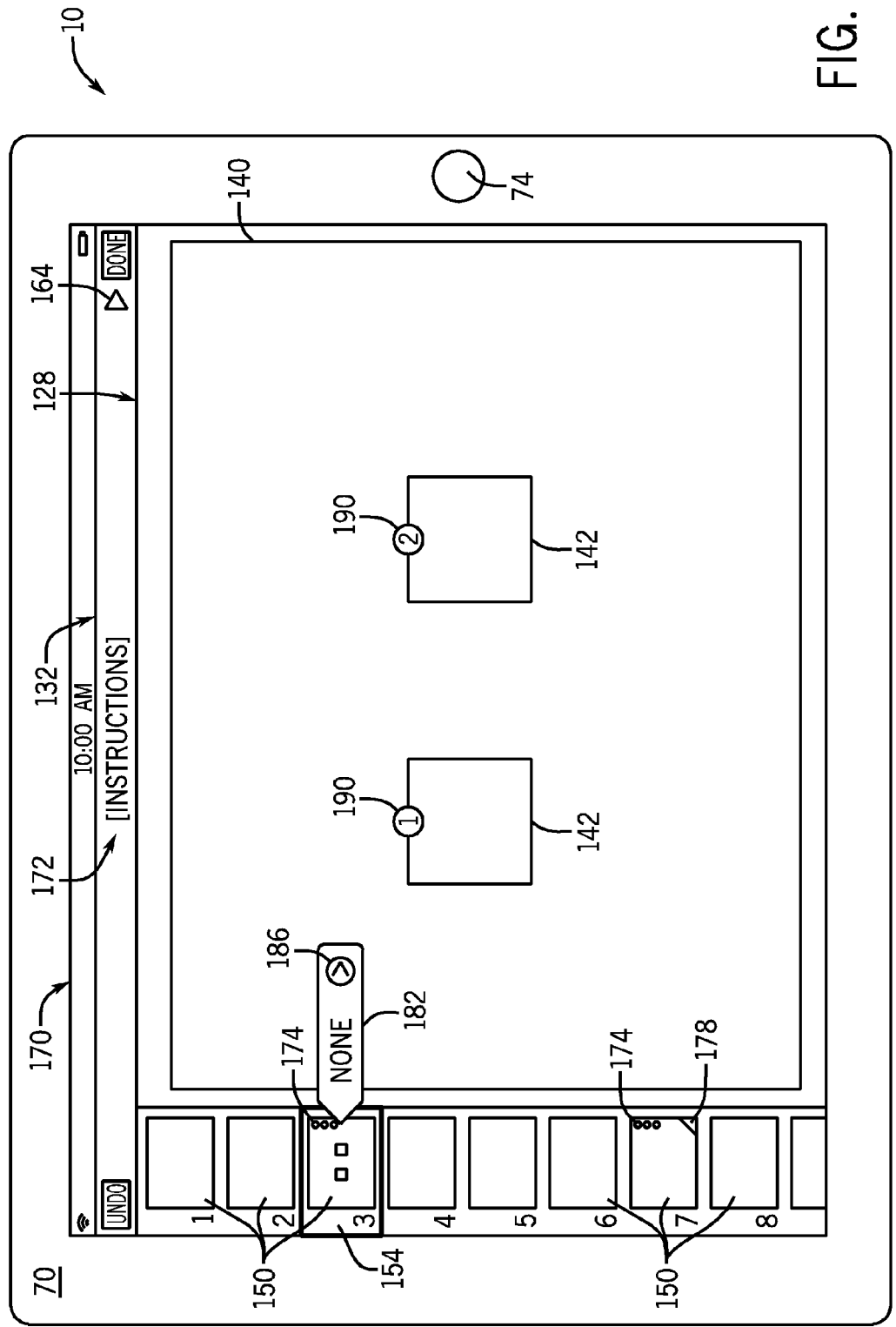
FIG. 7 depicts an initial animation mode screen of a presentation application in accordance with aspects of the present disclosure.
Figure 8:
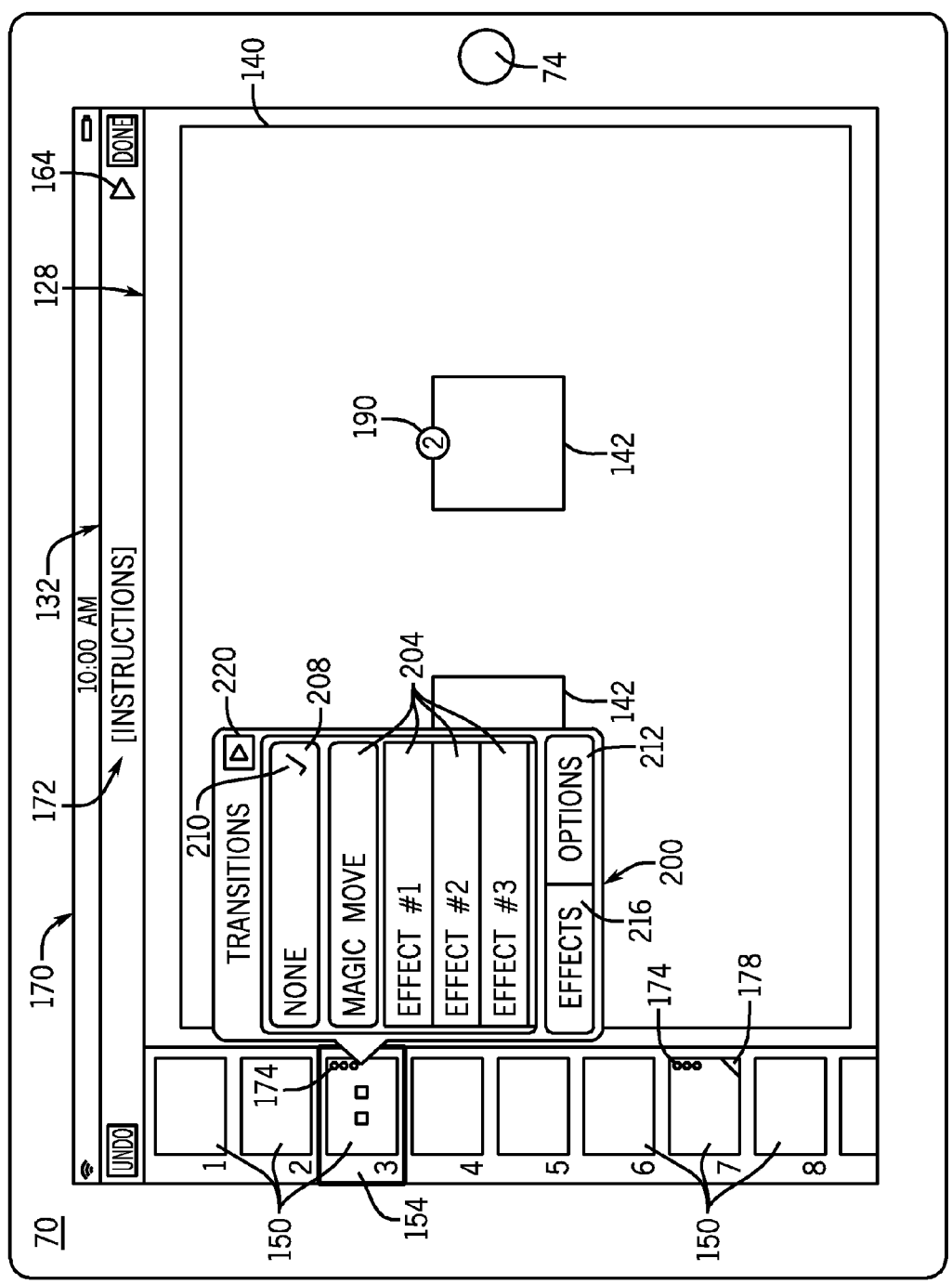
FIG. 8 depicts a transition box for previewing, reviewing, adding, or modifying slide transitions in accordance with aspects of the present disclosure.

With the foregoing examples and conventions in mind, an example is provided of one implementation by which an animation may be added or changed for a slide 140. Turning to FIG. 7, an animation mode screen is depicted in which a slide representation 150 is selected (as indicated by highlight region 154) and the corresponding slide 140 is displayed on the slide canvas 128. In the depicted example, a transition marker 182 is associated with the selected slide representation 150 and indicates that the selected slide 140 does not currently include a transition effect.

To add a transition effect to the selected slide, a user may select the selectable icon 186 provided on the transition marker 182 to cause the display of various transition options. For example, turning now to FIG. 8, selection of the selectable icon 86 of FIG. 7 may cause a transition box 200 to be displayed that lists available transitions and transition options. In this example, the transition box may list available transition effects 204 which may be selected or may provide an option 208 for not implementing a transition effect for the selected slide. In the example depicted in FIG. 8, no transition effect is currently selected and this is indicated by the visual indicator 210 (here depicted as a check mark) displayed next to the "None" option 208.

In addition, depending on the transition effect 204 selected, a user may also select an options selection 212 to configure one or more options (such as duration, delay, direction, what input initiates the transition, and so forth) that pertain to the selected transition effect. Likewise, to list the relevant transition effects (or to return to a listing of the relevant transition effects after viewing options), the user may select a displayed effects selection 216. In addition, in the depicted embodiment, a preview button 220 may be provided which, when selected, displays the selected slide 140 and selected transition effect 204 on the slide canvas 128. Once the preview is completed, the screen may once again display what was shown prior to the preview, such as the transition box 200 and so forth. In certain embodiments, regions around slide canvas 128 may be dimmed or hidden from view for the duration of the preview. If a transition effect is assigned to a selected slide 140, a transition marker may be displayed on the slide representation 150 in the navigator pane 124, as discussed above.

Figure 9:
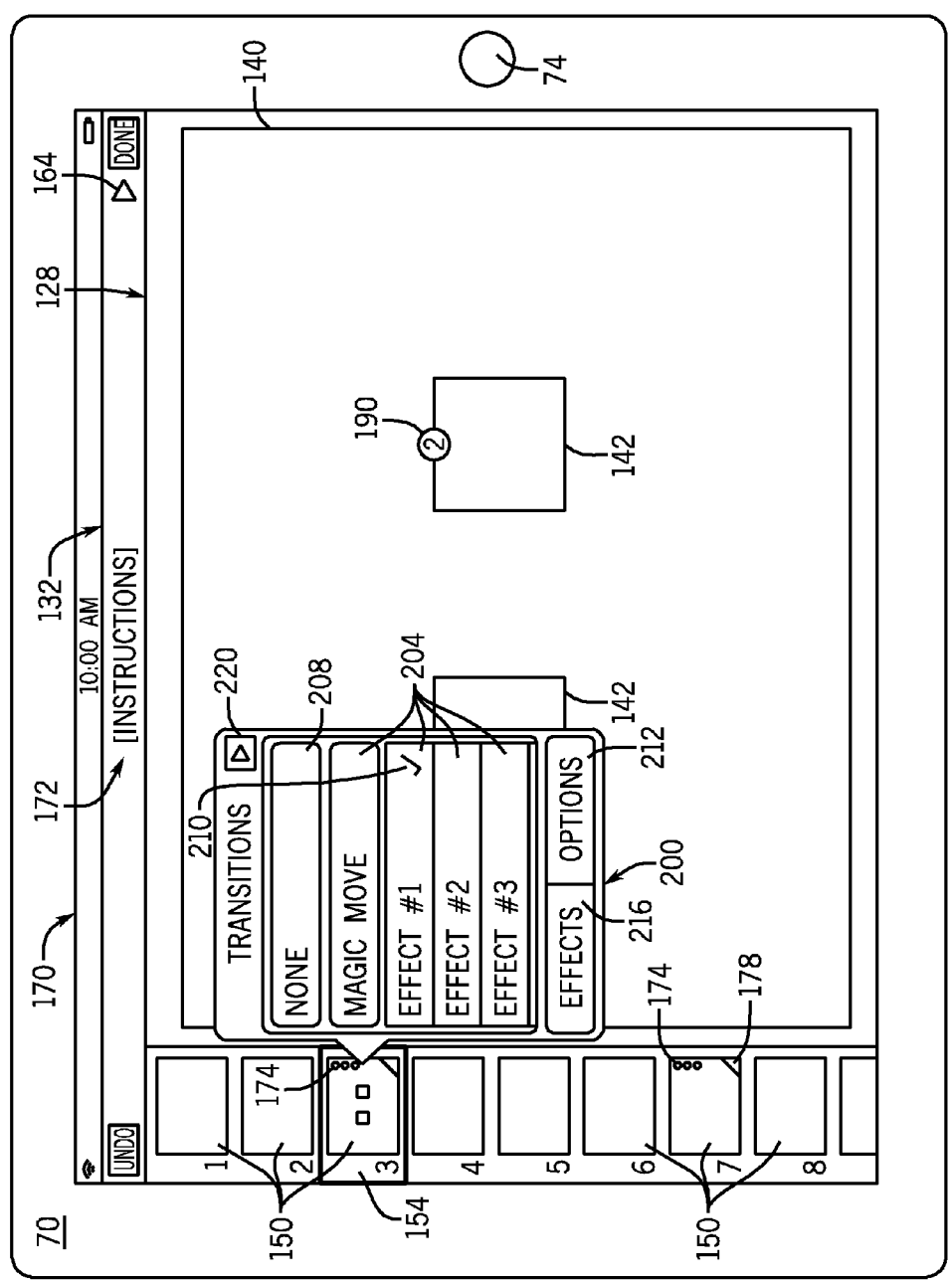
FIG. 9 depicts a transition box with a slide transition selected in accordance with aspects of the present disclosure.
Figure 10:
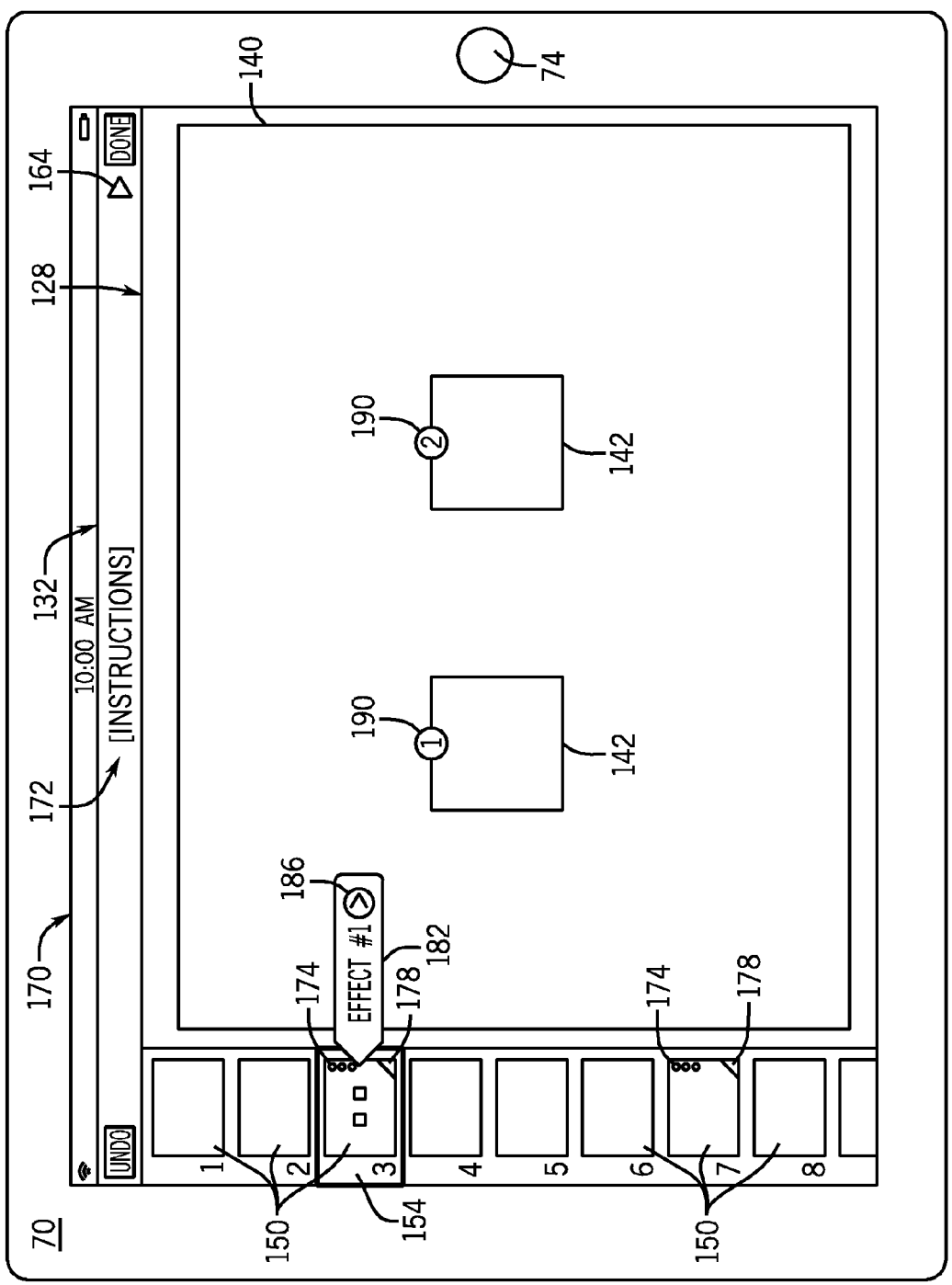
FIG. 10 depicts an animation mode screen after assignment of a slide transition in accordance with aspects of the present disclosure.
Figure 11:
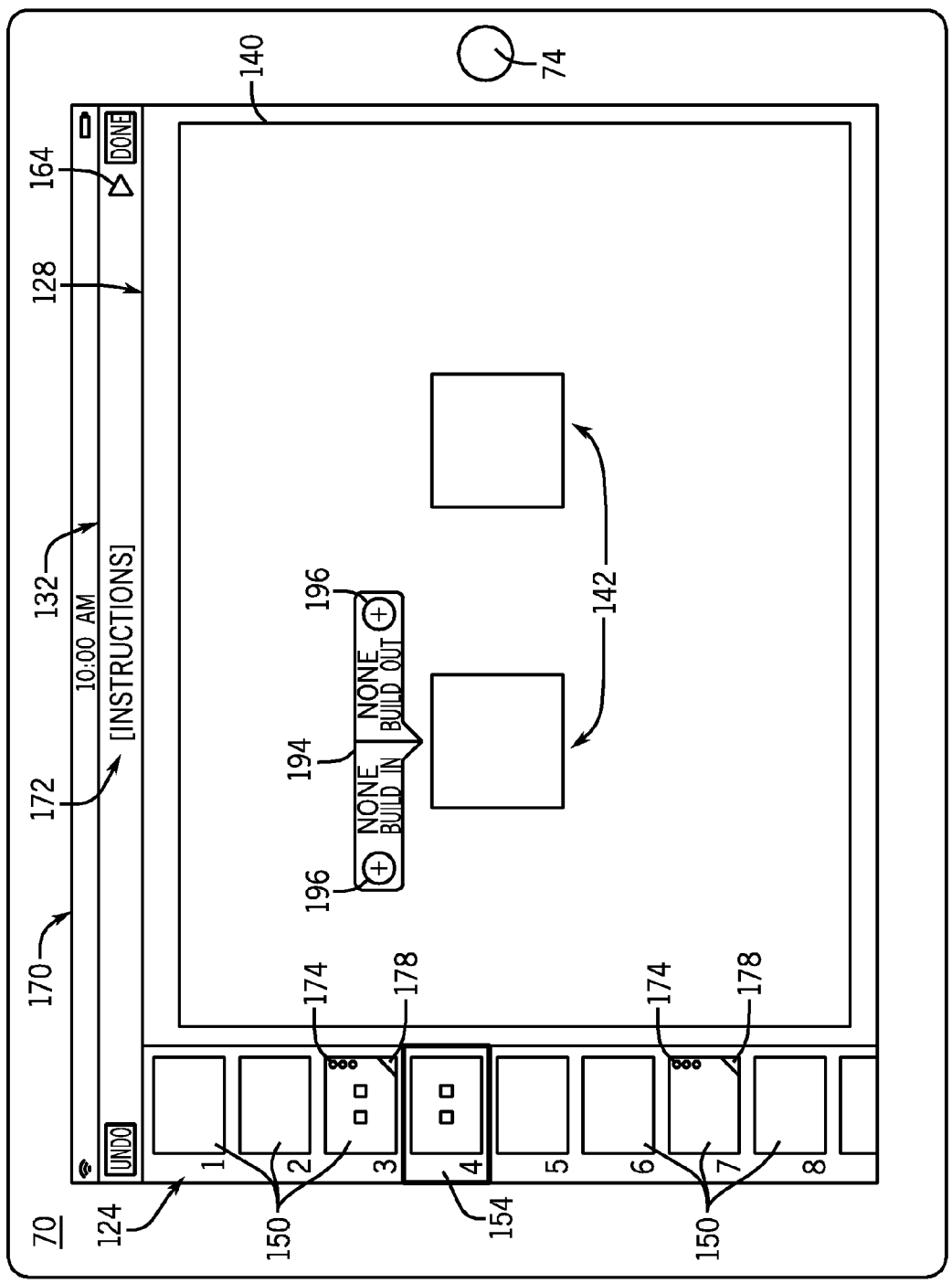
FIG. 11 depicts a build marker of a user interface in accordance with aspects of the present disclosure.
Figure 12:
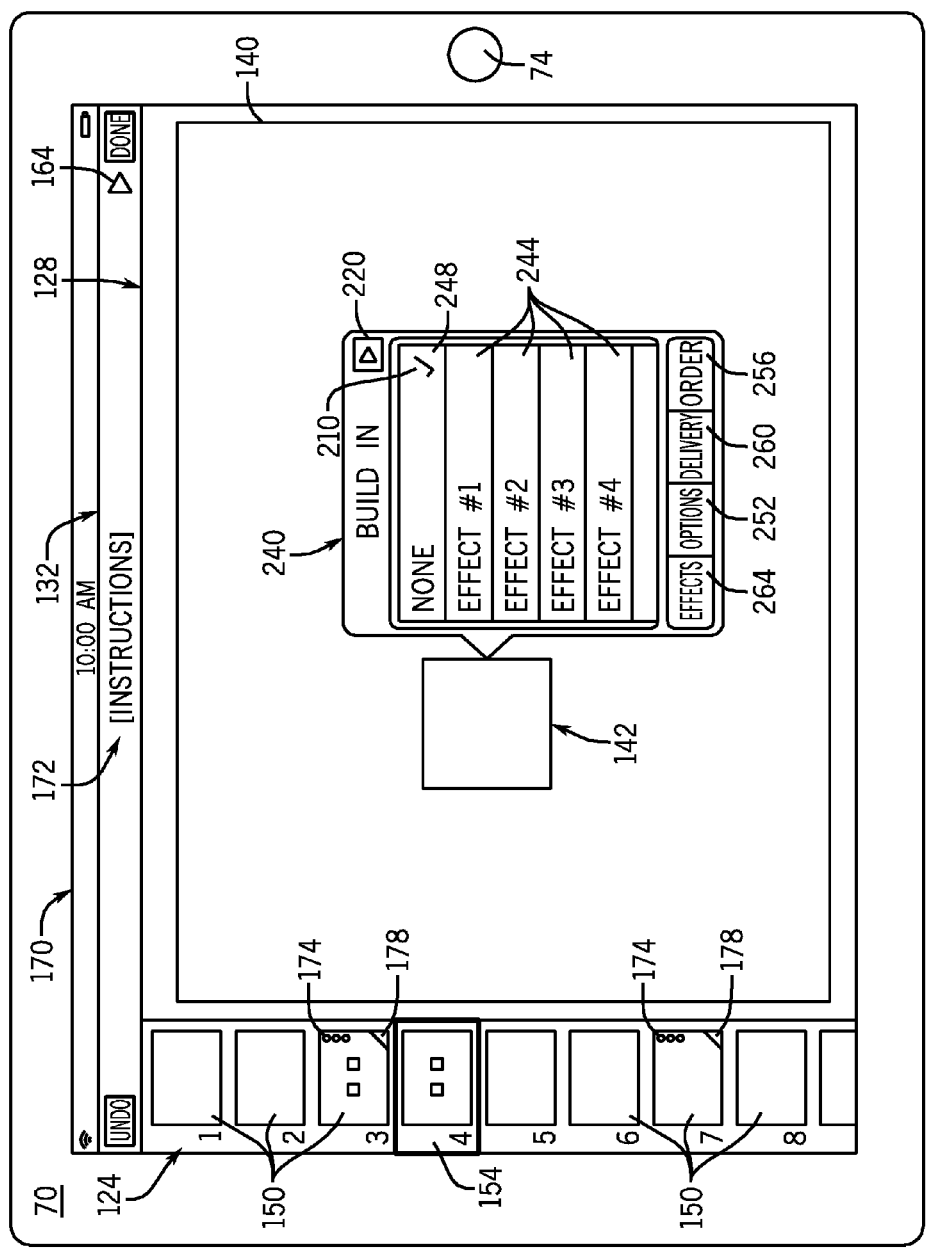
FIG. 12 depicts a build box for previewing, reviewing, adding, or modifying object builds in accordance with aspects of the present disclosure.

In the example depicted in FIG. 9, the user has selected a first effect as a transition effect for the selected slide. Thus, in this example the visual indicator 210 (here depicted as a check mark) is now displayed next to the "Effect #1" selection among the listed transition effects 204. In addition, once a slide transition is selected for the selected slide 140, the corresponding slide representation 150 in the navigator pane 124 may be updated to include a slide transition indicators 178, as depicted in FIG. 9. Further, once a transition effect is selected using the transition box 200, the transition box 200 may be closed and/or minimized so that a transition marker 182 is once again displayed proximate to the selected slide representation 150 in the navigator pane 124, as depicted in FIG. 10. In this example, because the selected slide now has an associated transition effect, the transition marker 182 now displays the selected transition effect (here listed as "Effect #1" by way of example) for the slide 140.

While the preceding describes aspects of the present disclosure related to assigning, previewing, reviewing, and/or modifying transition effects associated with slides 140 of a slide presentation, other aspects of the disclosure relate to assigning, previewing, reviewing, and/or modifying builds (e.g., animations) associated with objects 142 on a slide 140. For example, turning now to FIG. 11, a slide 140 is displayed on the slide canvas 128 of an animation mode screen 170. The selected slide 140 includes two objects 142 with no associated builds, as evidenced by the absence of build indicators 190 on the objects 142.

In the depicted example, selection of an object 142, such as the leftmost object, may cause a build marker 194 to be displayed. In this example, due to the absence of builds on the selected object, the build marker 194 indicates that the current build-in and build-out for the selected object is "None". A selectable icon 196 is provided for each of the build-in and build-out halves of the build marker 194, allowing a user to select the selectable icon 196 to view available build-in or build-out effects for the selected object. For example, turning now to FIG. 12, selection of the selectable icon 196 associated with the build-in option may cause a build box 240 to be displayed that lists available builds and build options for the selected object. In this example, the build box 240 may list available build effects 244 which may be selected or may provide an option 248 for not implementing a build effect for the selected object. In the example depicted in FIG. 12, no build effect is currently selected and this is indicated by the visual indicator 210 (here depicted as a check mark) displayed next to the "None" option 248.

Depending on the build effect 244 selected, a user may also select a number of other build characteristics to modify, such as options selection 252 to configure one or more options (such as duration, delay, direction, what input initiates the transition, and so forth) that pertain to the selected build effect, order selection 256 to configure where in the build-in sequence the current build will be placed, and delivery selection 260 to configure aspects of how the build will be implemented (such as whether text is delivered all at once or by paragraph). Likewise, to list the relevant build effects (or to return to a listing of the relevant build effects after viewing other build characteristics), the user may select a displayed effects selection 264. As will be appreciated, in various embodiments, the tabs representing options 252, 256, 260 and 264 may be visually distinguished, such as by dimming or graying out, to indicate which option is currently selected and/or which tabs are not selected or are disabled. In this way a user may be able to easily determine which options are currently selected and displayed within the build box 240.

Figure 13:
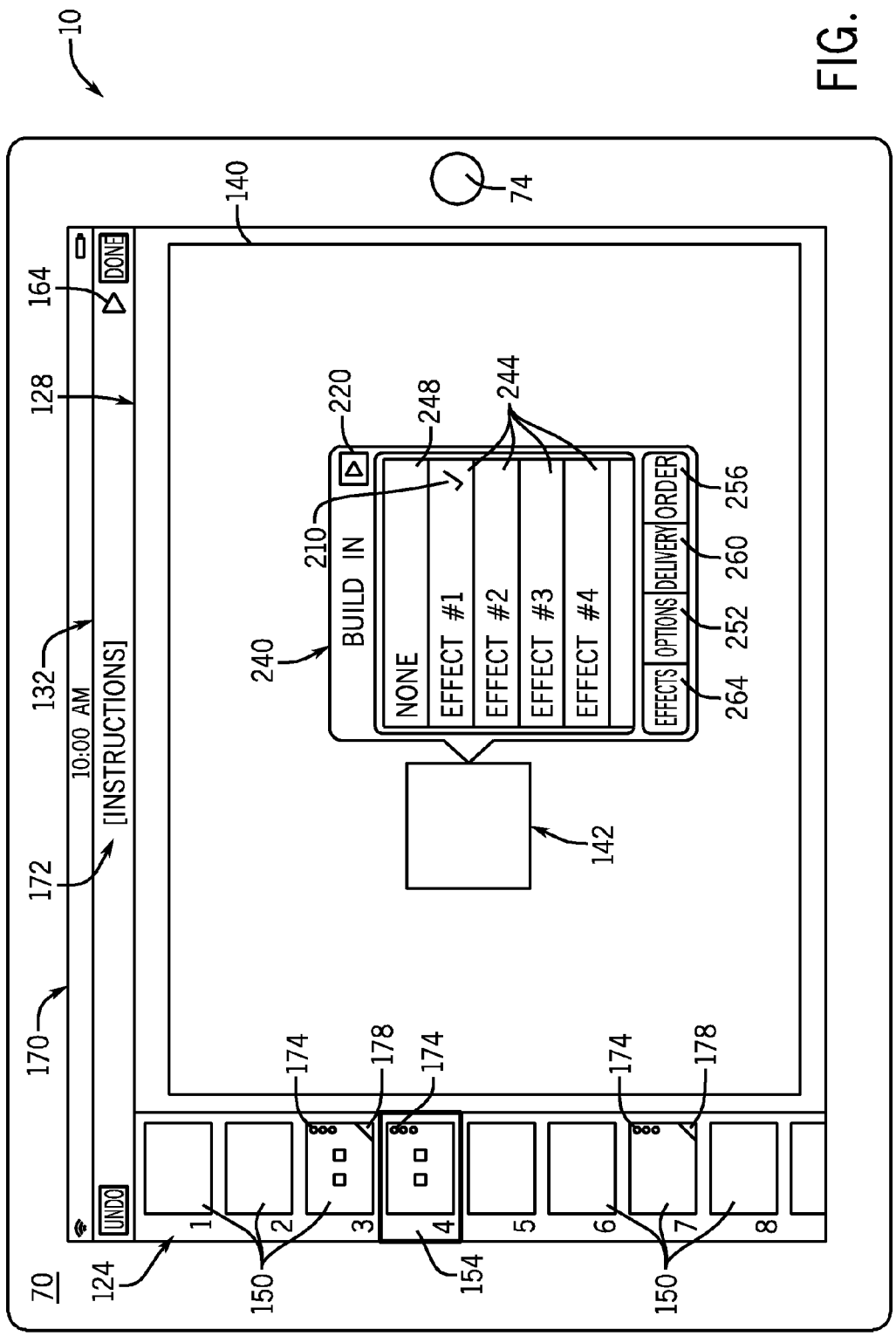
FIG. 13 depicts a build box with an object build selected in accordance with aspects of the present disclosure.

In the example depicted in FIG. 13, the user has selected a first effect as a build for the selected object. Thus, in this example the visual indicator 210 (here depicted as a check mark) is now displayed next to the "Effect #1" selection among the listed builds 244. In addition, once a build is selected for the selected object, the corresponding slide representation 150 in the navigator pane 124 may be updated to include an object build indicator 174, as depicted in FIG. 13.

Figure 14:
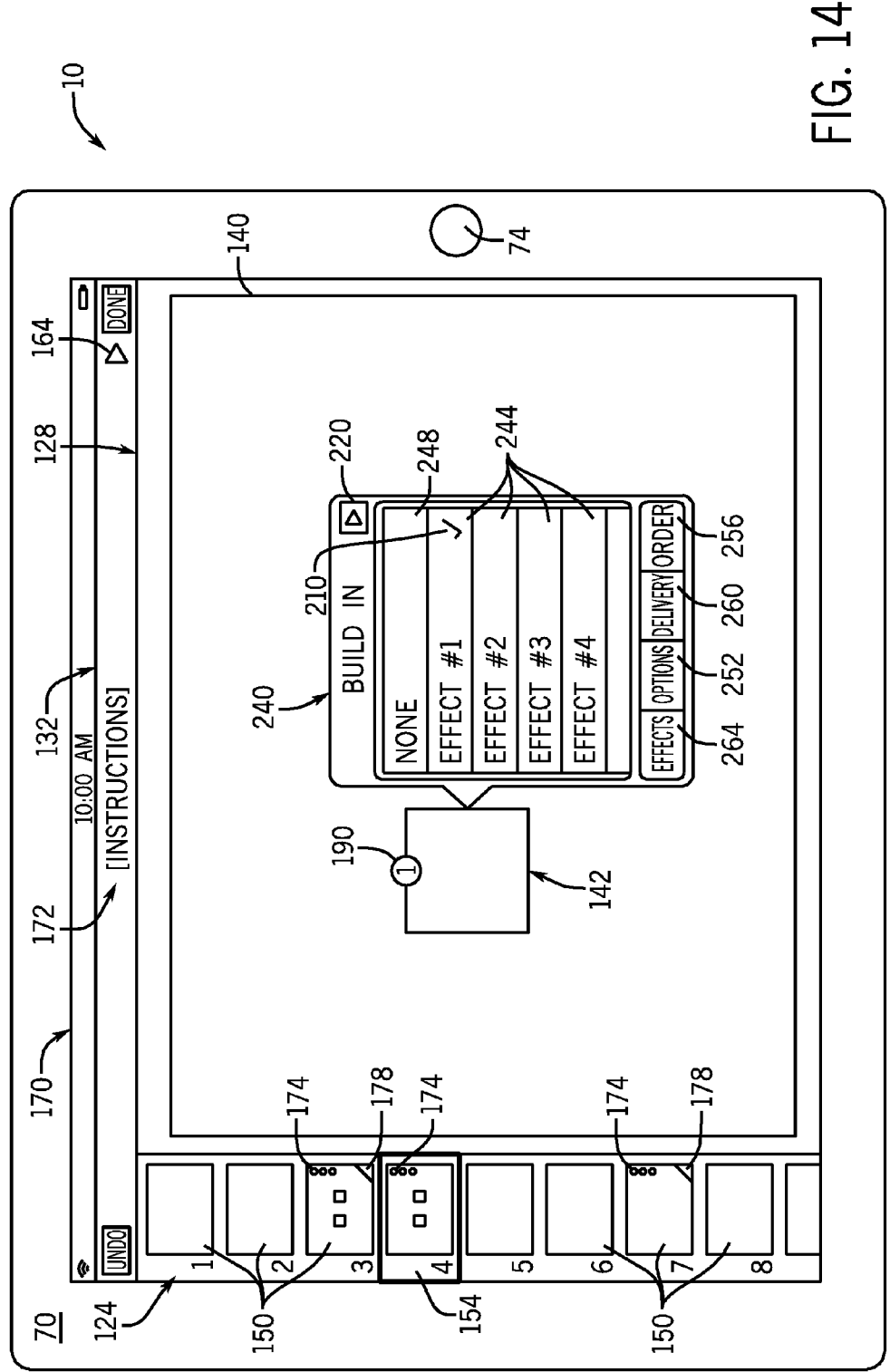
FIG. 14 depicts a build box with an object build selected and a build indicator displayed in accordance with aspects of the present disclosure.

Further, once a build is selected using the build box 240 and/or once the build box 240 is closed or minimized, a build indicator 190 may be displayed on or proximate to the selected object 142, as depicted in FIG. 14. In this example, because the selected object now has an associated build-in effect, the build indicator 190 now displays the build-in order for the object 142. For example, in the depicted example, the build indicator 190 indicates that the build-in performed on the selected object is first in the build-in sequence. As will be appreciated, though the present discussion relates to build-in order by way of explanation, the same concepts apply to build-out order as well and an object having both a build-in and build-out applied may have both sequence positions conveyed by the build indicator 190. For example, the build indicator 190 may, by convention, display the build-in sequence number on the left and the build-out sequence number on the right. Similarly, the build-in and build-out sequence numbers may be visually differentiated, such as by different colored numerals or background (such as displaying a yellow background for the build-in sequence number and a black background for the build-out sequence number). Likewise, a once a build-in and/or build-out effect is selected, a build marker 194, when displayed for a selected object 142, may indicate the selected build-in and/or build-out effect, as depicted in FIG. 5.

Figure 15:
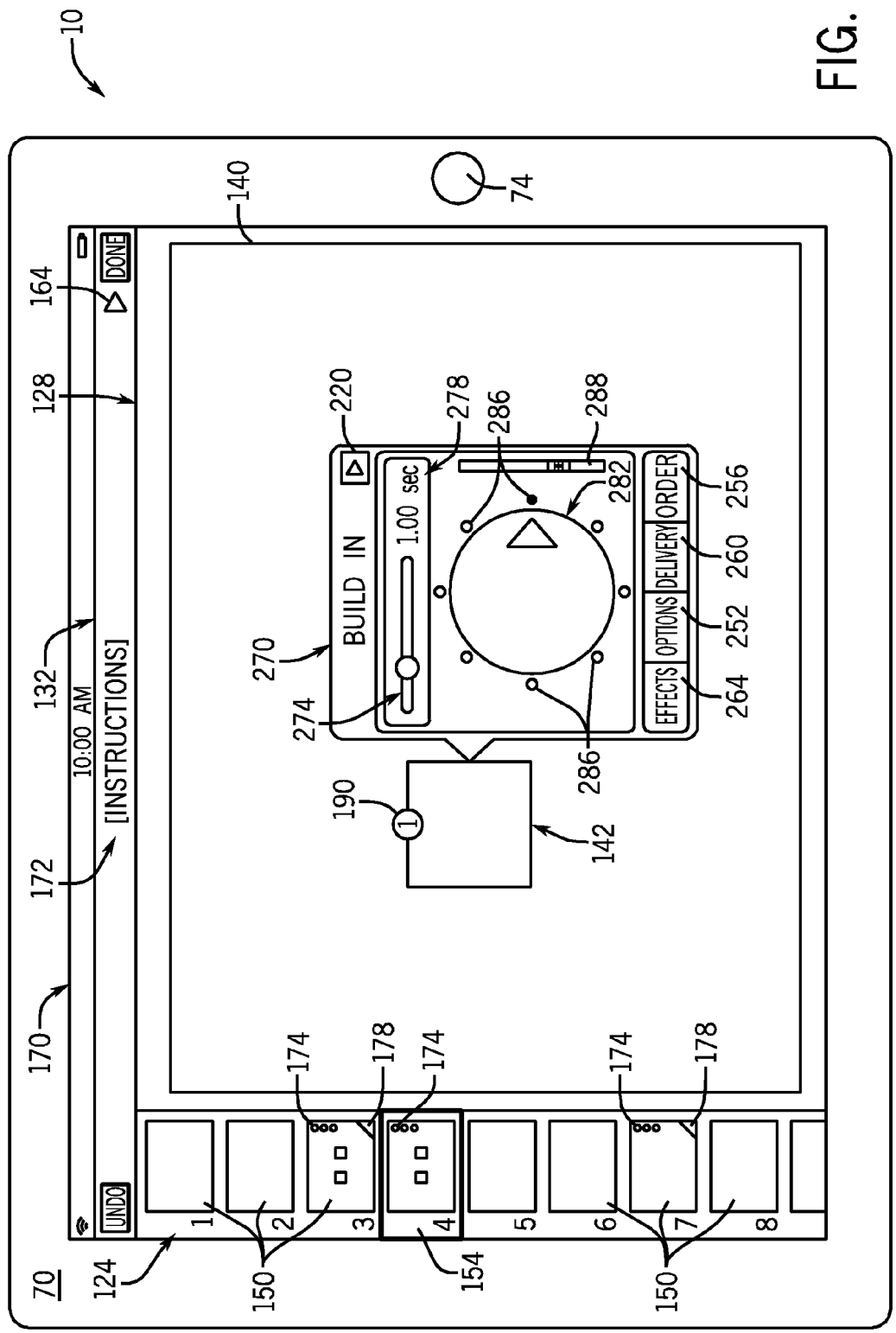
FIG. 15 depicts a build option interface in accordance with aspects of the present disclosure.

In addition, as noted above, the user may specify one or more options related to a build effect. For example, after selecting a build effect from the available build effects listed in a build box 240 (FIG. 13), the user may invoke an options selection 252 to cause the display of an options interface 270, as depicted in FIG. 15. In one such embodiment, the options interface 270 may allow parameters of the selected build effect, such as direction, duration, initiation event, delay, and so forth, to be configured by the user. For instance, in the depicted example, a slider control 274 may be provided to allow the user to adjust the duration over which the selected build is applied. In the depicted example, the current value 278 of the duration may be displayed beside the slider control 274 so that a user may observe the change in duration as he or she adjusts the slider control 274.

In the depicted example, a virtual dial control 282 is also depicted. In one embodiment, such a virtual dial control 282 may be used in conjunction with a touch screen or other touch sensitive structure or display where a physical dial or interface structure is not available and/or desirable. In such an embodiment, the user may adjust or turn the dial control 282 using the touch sensitive interface to specify a direction (or other suitable parameter) that the selected build effect moves toward or from. For example, in the depicted view, the selected build-in effect would presumably build-in from or toward the right. As will be appreciated, different build effects may have different directions they build from or toward. As a result, different numbers and/or placements of detents 286 may be provided with respect to the dial control 282, depending on the build effect being configured. For example, in some implementations only two detents may be present (such as left and right or up and down). In other implementations four detents may be present (such as for the cardinal or diagonal directions). Likewise, in other implementations eight or sixteen detents may be presented. Further, as will be appreciated, depending on the build effect being configured, in some embodiments the detents may be evenly spaced apart while in other embodiments the detents may not be evenly spaced apart. In embodiments in which the direction (or other suitable parameter) may be arbitrary, no detents may be provided and the user instead may configure a direction from anywhere along the dial control 282. In certain embodiments where a discrete set of directions are available and/or where the options are not well suited for selection with a dial (such as clockwise, anticlockwise, random, and so forth) a list representation may be displayed for the user to select from instead of the virtual dial control 282.

As depicted, in certain embodiments, other build options may also be present, such as additional sliders, dials, lists of selections, and so forth, as indicated by the presence of scroll bar 288. By use of such a scroll bar 288, the size of the open window may be reduced while still allowing the user to access a range of options. In one embodiment, the more commonly used options may be initially displayed in the options interface 270 while less commonly used options may be accessed by scrolling down using the scroll bar 288.

Figure 16:
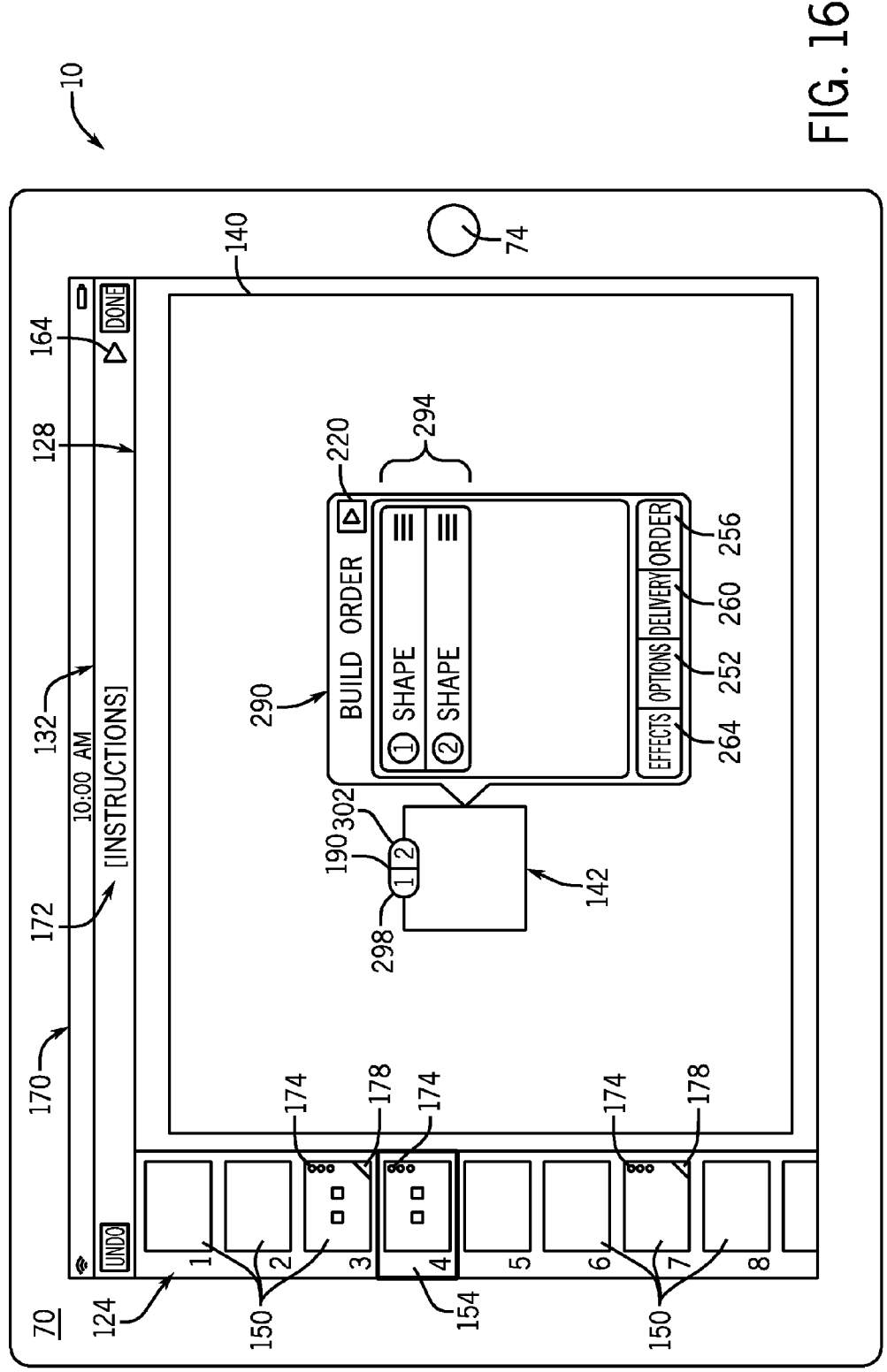
FIG. 16 depicts a build order interface in accordance with aspects of the present disclosure.

Further, as discussed above, the user may specify the order in which build effects are applied. For example, when configuring a build selected for an object, the user may invoke the order selection 256 of a build box 240 or similar interface. The order selection 256 may in turn cause the display of a build order interface 290, as depicted in FIG. 16. Such a build order interface 290 may be specific to either build-in order or build-out order for objects 142 on the slide 140 in embodiments where objects may have both a build-in effect and a build-out effect. That is, the displayed build order interface 290 may only allow review and or alteration of the build-in order or the build-out order at one time, though in certain embodiments a tab or other selection mechanism may be provided to easily switch between the build-in and build-out lists. In one example, the build order interface 290 relates only to a build-in or build-out order at a given time and depicts the respective items or objects in the build-in or build-out queue 294.

In one embodiment, the build order interface 290 displays all of the builds on the slide 140, not just the build associated with the selected object. In such an embodiment, the user may perform a global rearrangement of the ordering of animations for the selected slide 140 since all of the build-in and/or build-out animations on the slide are listed. For example, the user may rearrange the build queue 294, such as by dragging listed entries to different positions and/or by invoking an order entry screen from which a sequence number may be assigned for a specific object and/or build or for each object and/or build represented on a selected slide 140. In one embodiment, by selecting different build order table entries, focus may be switched to the different respective objects associated with current build order, i.e., by selecting an entry in the build order queue, different objects 142 may be selected.

Further, in the depicted example, once the build order is specified, the build indicator 190 displayed on or proximate to the respective object may convey the respective build-in sequence information 298 and build-out sequence information 302, if both a build-in and build-out are associated with the object. To distinguish between build-in and build-out information in such embodiments, the build-in and build-out information may be visually distinguished. For example, the build indicator 190 may display the build-in sequence number 298 on the left and the build-out sequence number 302 on the right and/or may use different colored numerals or background to distinguish between build-in and build-out information.

Figure 17:
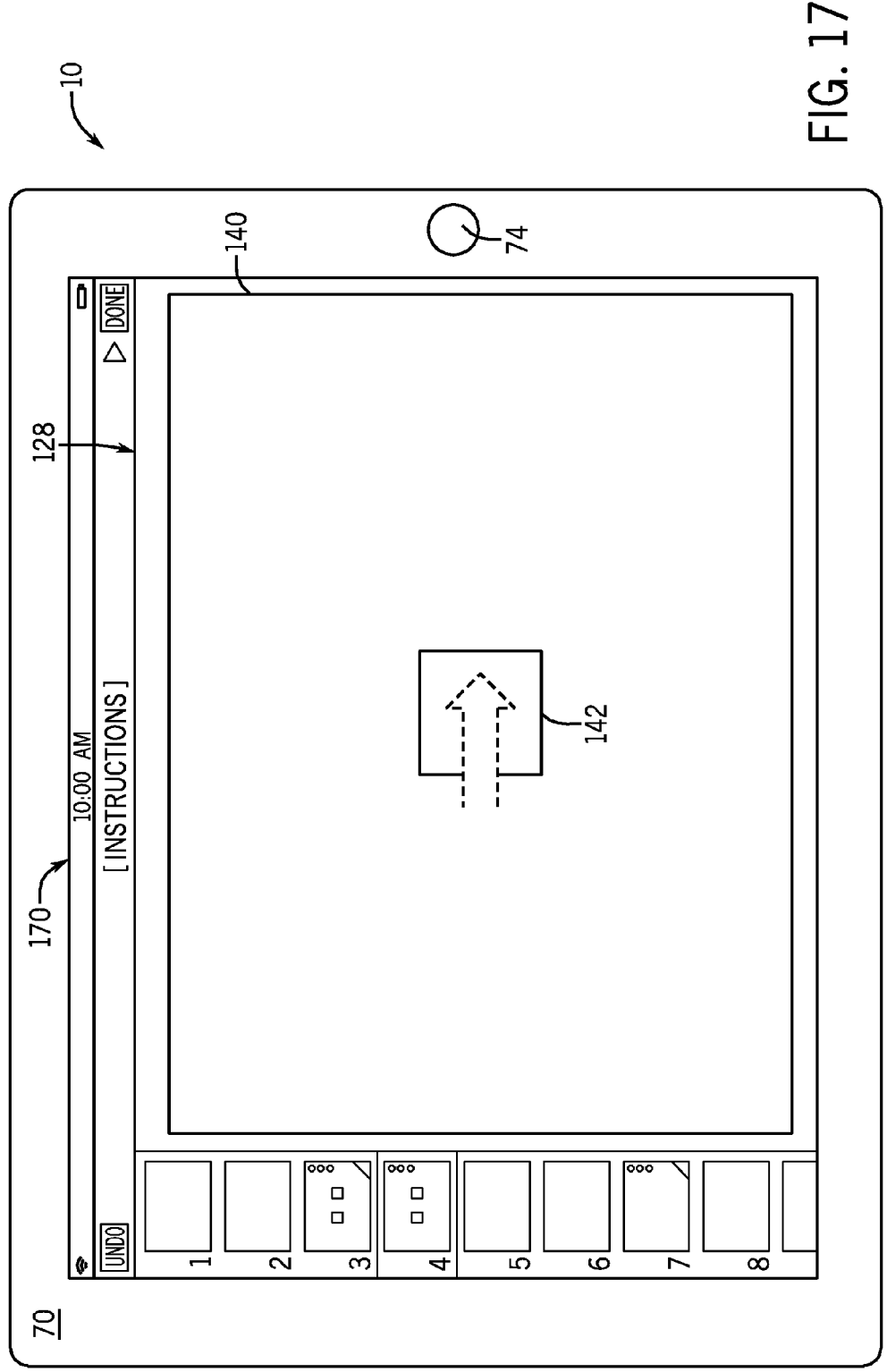
FIG. 17 depicts a preview in accordance with aspects of the present disclosure.
Figure 18:
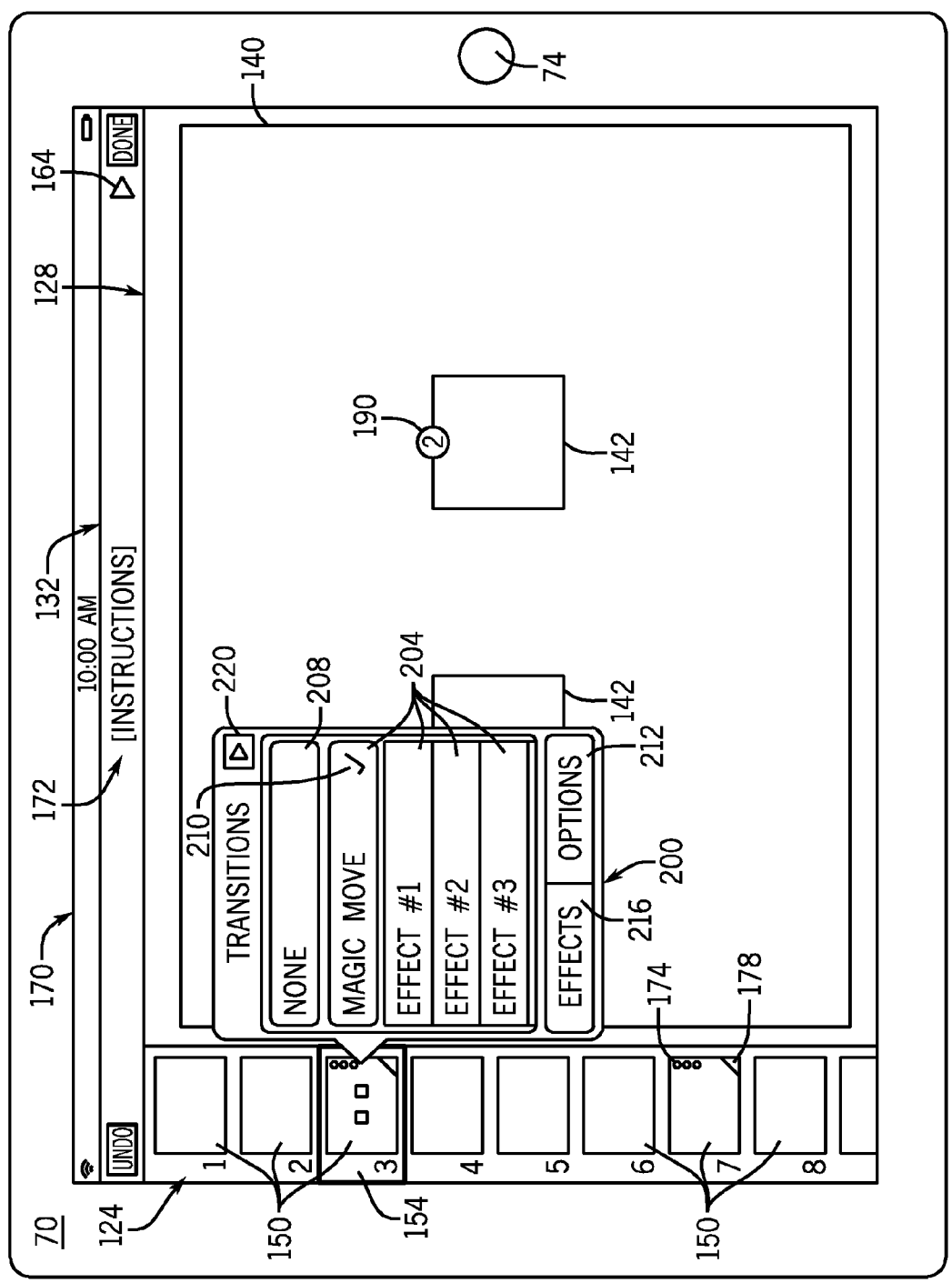
FIG. 18 depicts a transition box in accordance with aspects of the present disclosure.

In addition, in the depicted embodiment, a preview button 220 may be provided which, when selected, displays the selected slide 140 and associated object builds on the slide canvas 128 (see, for example, FIG. 17 depicting an object 142 sliding in from the side). Alternatively, the preview may occur automatically upon selection and/or modification of a build from the available list. Once the preview is completed, the screen may once again display what was shown prior to the preview, such as the build box 240 and so forth. As depicted in FIG. 17, in certain embodiments, regions around slide canvas 128 may be dimmed or hidden from view for the duration of the preview. Once the preview is over, the dimmed regions may return to their normal degree of visibility. Alternatively, for a full screen preview, the navigator pane 124, title, and tool bar 132 may be slid off the screen or otherwise removed from the viewing area and the slide canvas 128 is scaled-up to fill the available screen space. Upon completion of the preview, the slide canvas 128 may be scaled back down and the navigator pane 124, title, and tool bar 132 may be slid back into view or otherwise returned to the viewing area.

The preceding discussion distinguishes between transitions applied to slides 140 of a presentation and builds (e.g., animations) applied to objects 142 on a slide being displayed. In some instances, however, an object 142 may be present on consecutive slides 140 and may be undergo particular builds due to this persistence. For example, such a persistent object may be animated during a slide transition such that the appearance of the object in both the outgoing and incoming slide is bridged by the animation. Such an animation may be generated automatically, i.e., without a user having to provide additional instructions. Thus, in such a situation, a slide transition is involved in conjunction with an animation of an object that is present on both the incoming and outgoing slides.

Figure 19:
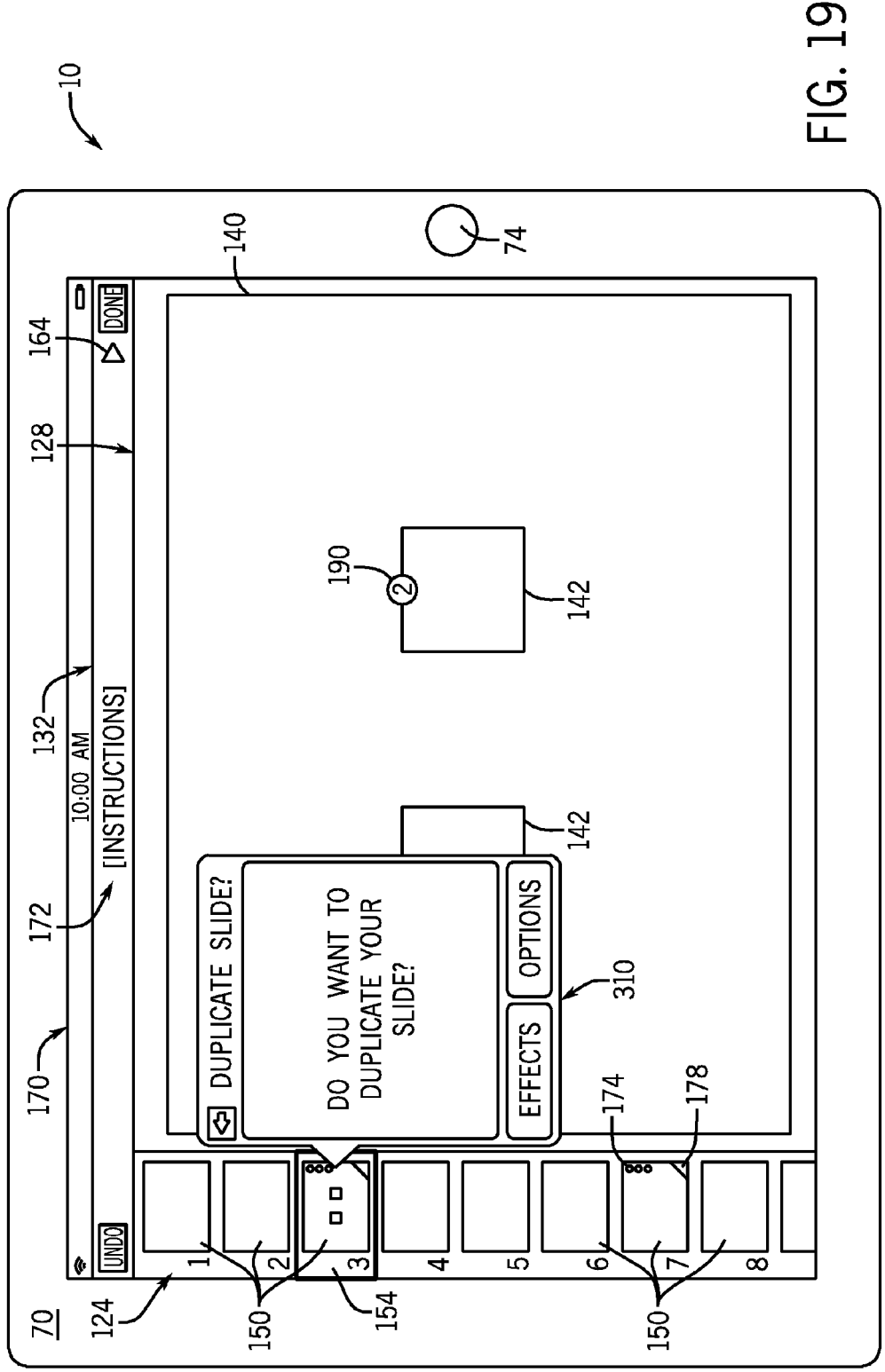
FIG. 19 depicts a dialog box in accordance with aspects of the present disclosure.
Figure 20:
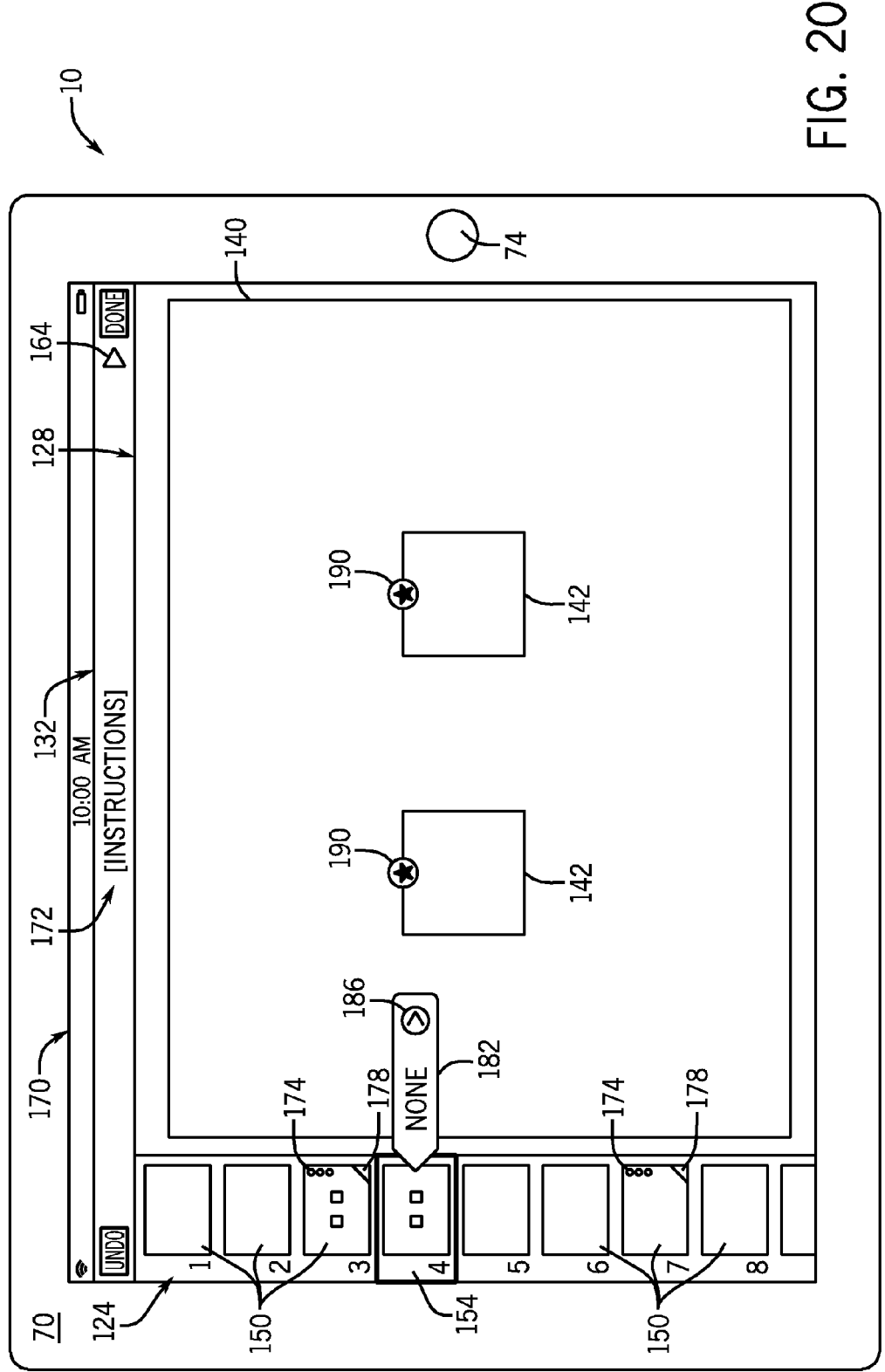
FIG. 20 depicts objects and build indicators in accordance with aspects of the present disclosure.

Such a slide transition and object build scenario may be accommodated by certain embodiments of the present disclosure. For example, turning to FIG. 18, a transition box 200 is depicted that lists a Magic Move® transition found in certain versions of the Keynote® presentation application available from Apple Inc. Upon selection of the Magic Move® transition, denoted by visual indicator 210, a dialog box 310 is displayed, as depicted in FIG. 19. Because the Magic Move® transition relates to at least some objects being present on the outgoing and incoming slides 140, the dialog box 310 offer the user an option to duplicate the presently selected slide, thereby inserting a duplicate slide with duplicate objects as the next slide in the navigator pane 124 (as depicted in FIG. 20) if the user elects to do so. Though the objects may be duplicated, any builds associated with the objects would typically not be duplicated on the new slide. In this manner, there slide 140 to which the Magic Move® transition has been applied will have at least some objects 142 in common with the subsequent slide, thus making the Magic Move® transition possible.

For example, turning to FIG. 20, a user has selected "Yes" from the dialog box 310 depicted in FIG. 19, resulting in the creation of a duplicate slide (slide "4") with duplicated objects, which is now the selected slide in FIG. 20. In the depicted example, the duplicated objects are each displayed with a build indicator 190 as discussed above. However, in this example, the build indicator 190, instead of displaying a numeral reflecting the build order sequence of each object, displays a symbol (here a star) or other visual indicator to signify that these objects tagged in this manner are currently part of a build related to the slide transition. In certain embodiments, the objects so tagged may still be subject to other builds and may thus have other build and build sequence information which may be conveyed by the build indicator 190 and/or build marker 194. Further, the visual indicator and/or the background of the build indicator may be color coded or otherwise visually distinguished such that those object undergoing a Magic Move® transition on the outgoing slide are distinguishable from the same objects on the incoming slide. That is, the build indicator 190 may visually convey whether an object is undergoing a build in which the object is introduced from the preceding slide or is carried over in to the subsequent slide.

Figure 21:
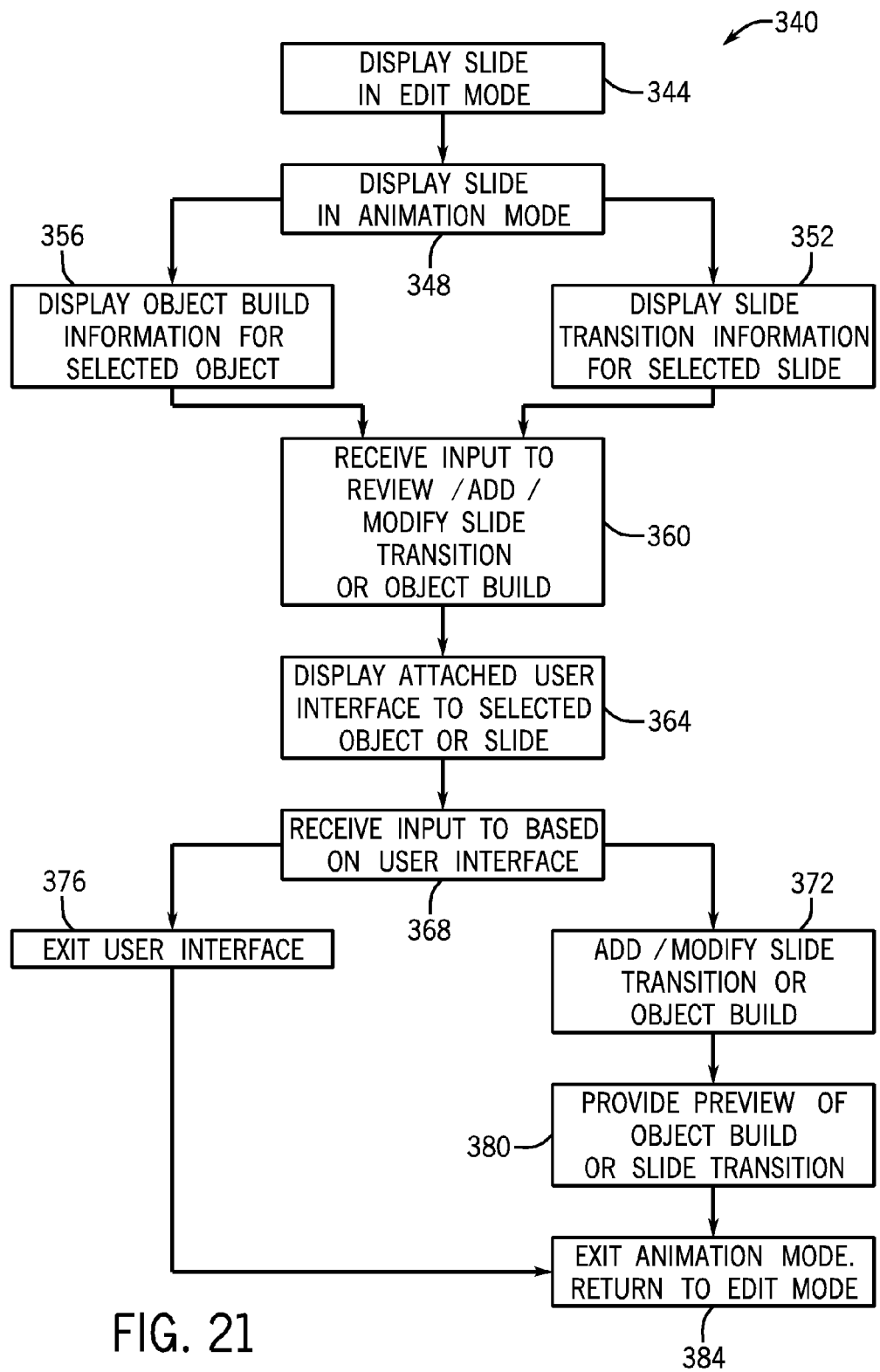
FIG. 21 depicts a flowchart of an algorithm for implementing aspects of the present disclosure in accordance with certain embodiments.

As will be appreciated, the foregoing implementations and embodiments may be embodied as computer-executable code stored on an electronic device 10 and executed by a processor 18 of such a device 10. For example, the approaches discussed herein may be embodied as routines and/or algorithms of a presentation application stored and executed on an electronic device 10. In one such embodiment, the algorithms involved in implementing the present user interface aspects may be characterized as described in the flowchart of FIG. 21. As depicted in this flowchart, in one embodiment, a presentation application may be in an edit mode (block 344), such as for creating or modifying a slide of a slideshow presentation. In this example, the presentation application may, in response to a user input, enter an animation mode (block 348) with respect to a slide, object, or slideshow presentation.

When in the animation mode, slide transition information for a selected slide may be displayed (block 352) and/or object build information for a selected object may be displayed (block 356). Such information may be displayed so that it is attached to or proximate to the selected slide or object and may be implemented to as to reduce the amount of open windows or objects displayed on the screen (i.e. to reduce screen clutter) and/or to simplify operation for the user. For example, in one embodiment, only a single transition control or build control would be displayed at one time, thereby limiting the options and/or choices confronting a user. In one embodiment, a user input may be received (block 360) indicating that a slide transition or object build is to be added, reviewed, or modified. In response to this input, the application may display (block 364) a user interface, such as a transition box 200 or build box 240, attached or proximate to the selected object or slide. The user may then interact with the user interface to provide one or more inputs that are received (block 368) by the application and which are used to add or modify an object build or slide transition (block 372). Alternatively, the user may decided to make no additions or changes and may instead exit the user interface (block 376). In one embodiment, once the additions and/or changes are received, a preview of the slide transition and/or the object build may be provided (block 380) in a full screen or slide canvas mode, generally corresponding to a full size preview of the effect. Once all additions and/or changes have been made with respect to the selected slide transitions and/or object builds, the animation mode may be exited.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for displaying animation information comprising:
displaying, on a display of a touch screen electronic device, a touch-sensitive navigator pane on which a plurality of slide representations are displayed;

displaying, on the display, a slide canvas on which a slide is displayed, wherein the slide corresponds to a touch-selected slide representation displayed on the navigator pane;

displaying, on the display, a transition marker visually adjacent and pointing to the selected slide representation, wherein the transition marker conveys the type of transition applied to the slide if a transition is applied to the slide.

2. The method of claim 1, wherein the transition marker includes a touch-selectable area that, when selected, opens a transition box visually adjacent and pointing to the selected slide representation.

3. The method of claim 2, wherein the transition box lists available transition effects that may be applied to the slide.

4. The method of claim 2, wherein the transition box displays options for configuring a selected transition effect.

5. Computer-readable, non-transitory media comprising a computer program product, the computer program product comprising routines which, when executed on a processor, perform the following:

entering an animation mode of a presentation application;

displaying a navigator pane in which a plurality of touch sensitive selectable slide representations are displayed;

receiving a first user touch-input selecting a slide representation;

displaying a transition marker visually adjacent and pointing to the selected slide representation, wherein the transition marker indicates the type of transition effect, if any, associated with a slide associated with the selected slide representation.

6. The computer-readable, non-transitory media of claim 5, wherein the computer program product comprises routines which, when executed on the processor, perform the following:

receiving a second user input;

displaying a transition box in place of the transition marker, wherein the transition box lists available transition effects for the slide.

7. The computer-readable, non-transitory media of claim 6, wherein the transition box allows one or more parameters of a selected transition to be changed.

8. The computer-readable, non-transitory media of claim 6, wherein the computer program product comprises routines which, when executed on the processor, perform the following:

receiving a selection or modification of a transition effect for the slide;

automatically previewing the transition effect on a slide-canvas or in a full-screen mode upon receipt of the selection or modification.

9. The computer-readable media of claim 5, wherein the computer program product comprises routines which, when executed on the processor, perform the following:

previewing the transition effect on a slide-canvas or in a full-screen mode upon receipt of the preview command;

wherein areas outside the slide canvas are visually dimmed or removed from view during the preview.

10. A method for displaying animation information comprising:

displaying, on a display of a touch screen electronic device, a slide canvas on which a slide is displayed;

displaying, on the display, two or more objects on the slide;

displaying, on the display, a build indicator on each of the objects, wherein the build indicator conveys information about the order in which a build is applied to each of the objects;

receiving a touch selection by a user of a displayed object;

displaying a build marker visually adjacent and pointing to the selected object, wherein the build marker conveys additional build information not present on the build indicator;

receiving user input on the build marker; and in response to the user input, displaying a build box opened in a location based on the position of the selected object on the display, wherein the build box is visually adjacent and points to the selected object and displays the available build effects for the selected object.

11. The method of claim 10, wherein the build box displays options for configuring a selected build effect for the selected object.

12. The method of claim 10, wherein the build box displays options for ordering the builds on a slide.

13. Computer-readable, non-transitory media comprising a computer program product, the computer program product comprising routines which, when executed on a processor, perform the following:

entering an animation mode of a presentation application;

displaying a slide canvas in which two or more objects are displayed;

displaying a build indicator on each of the objects, wherein the build indicator conveys at least information about the order in which a build is applied to each of the objects;

receiving a first touch input selecting an object;

displaying a build marker visually adjacent and pointing to the selected object, wherein the build marker displays a textual indication of the type of build effects or animations, if any, associated with the selected object;

receiving a second touch input;

displaying a build box in place of the build marker, wherein the build box allows a user to create or modify a build effect associated with the object, to configure one or more parameters of the build effect, or establish or modify a build order of the build effect.

14. The computer-readable, non-transitory media of claim 13, wherein the build indicator displays at least an indication of build order.

15. The computer-readable, non-transitory media of claim 13, wherein the build marker conveys a build-in effect if present, a build-out effect if present, or both a build-in and build-out effect.

16. The computer-readable, non-transitory media of claim 13, wherein the build marker conveys one or more types of animations associated with transitioning the selected object from a first slide to a second slide.

* * * * *